United States Patent
Parsons et al.

(10) Patent No.: US 9,675,853 B2
(45) Date of Patent: *Jun. 13, 2017

(54) GOLF CLUB HEADS AND METHODS TO MANUFACTURE GOLF CLUB HEADS

(71) Applicant: Parsons Xtreme Golf, LLC, Scottsdale, AZ (US)

(72) Inventors: Robert R Parsons, Scottsdale, AZ (US); Michael R Nicolette, Scottsdale, AZ (US); Bradley D Schweigert, Anthem, AZ (US)

(73) Assignee: PARSONS XTREME GOLF, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/711,596

(22) Filed: May 13, 2015

(65) Prior Publication Data
US 2015/0328508 A1 Nov. 19, 2015

Related U.S. Application Data

(60) Continuation-in-part of application No. 14/589,277, filed on Jan. 5, 2015, now Pat. No. 9,421,437, which
(Continued)

(51) Int. Cl.
A63B 53/04 (2015.01)
A63B 53/06 (2015.01)

(52) U.S. Cl.
CPC ........ *A63B 53/0475* (2013.01); *A63B 53/047* (2013.01); *A63B 53/0466* (2013.01);
(Continued)

(58) Field of Classification Search
CPC ........ A63B 53/0475; A63B 2059/0003; A63B 59/0092; A63B 2053/0491;
(Continued)

(56) References Cited

U.S. PATENT DOCUMENTS 4,502,687 A * 3/1985 Kochevar .............. A63B 53/08 473/345
4,545,580 A * 10/1985 Tomita .................. A63B 53/04 473/332

(Continued)

OTHER PUBLICATIONS

U.S. Appl. No. 14/498,603, Parsons et al., "Golf Club Heads and Methods to Manufacture Golf Club Heads," filed Sep. 26, 2014.
(Continued)

*Primary Examiner* — Sebastiano Passaniti

(57) ABSTRACT

Embodiments of golf club heads and methods to manufacture golf club heads are generally described herein. In one example, a golf club head may include a body portion with a toe portion, a heel portion, a top portion, a sole portion, a back portion, a front portion having a face portion with a front surface and a back surface, an interior cavity extending between the top and sole portions and between the face and back portions, and an elastic polymer material in the interior cavity, and a bonding portion. Other examples and embodiments may be described and claimed.

20 Claims, 18 Drawing Sheets

Related U.S. Application Data is a continuation of application No. 14/513,073, filed on Oct. 13, 2014, now Pat. No. 8,961,336, which is a continuation of application No. 14/498,603, filed on Sep. 26, 2014, now Pat. No. 9,199,143, application No. 14/711,596, which is a continuation-in-part of application No. 29/511,482, filed on Dec. 11, 2014, now Pat. No. Des. 748,749, which is a division of application No. 29/501,006, filed on Aug. 29, 2014, now Pat. No. Des. 722,352, application No. 14/711, 596, which is a continuation-in-part of application No. 29/514,256, filed on Jan. 9, 2015, now Pat. No. Des. 748,214, which is a continuation-in-part of application No. 29/501,006, filed on Aug. 29, 2014, now Pat. No. Des. 722,352, application No. 14/711, 596, which is a continuation-in-part of application No. 29/515,013, filed on Jan. 20, 2015, now Pat. No. Des. 756,471, which is a continuation-in-part of application No. 29/501,006, filed on Aug. 29, 2014, now Pat. No. Des. 722,352.

(60) Provisional application No. 61/992,555, filed on May 13, 2014, provisional application No. 62/010,836, filed on Jun. 11, 2014, provisional application No. 62/011,859, filed on Jun. 13, 2014, provisional application No. 62/032,770, filed on Aug. 4, 2014, provisional application No. 62/041,538, filed on Aug. 25, 2014, provisional application No. 62/118,403, filed on Feb. 19, 2015, provisional application No. 62/159,856, filed on May 11, 2015, provisional application No. 62/041,538, filed on Aug. 25, 2014.

(52) U.S. Cl.
CPC ........... *A63B 2053/0408* (2013.01); *A63B 2053/0416* (2013.01); *A63B 2053/0445* (2013.01); *A63B 2053/0491* (2013.01); *A63B 2209/00* (2013.01)

(58) Field of Classification Search
CPC ........ A63B 2209/00; A63B 2053/0408; A63B 2053/0416; A63B 53/0466; A63B 2053/0445
USPC .................................. 473/324–350, 287–292
See application file for complete search history.

(56) References Cited

U.S. PATENT DOCUMENTS

| | | | |
|---|---|---|---|
| 4,614,627 A | 9/1986 | Curtis et al. | |
| D294,617 S | 3/1988 | Perkins | |
| 4,754,977 A | 7/1988 | Sahm | |
| 4,803,023 A * | 2/1989 | Enomoto | A63B 53/04 264/45.4 |
| 4,824,116 A | 4/1989 | Nagamoto et al. | |
| 4,883,623 A | 11/1989 | Nagamoto et al. | |
| 4,928,972 A | 5/1990 | Nakanishi et al. | |
| 4,988,104 A * | 1/1991 | Shiotani et al. | 473/305 |
| 5,064,197 A * | 11/1991 | Eddy | A63B 53/04 473/326 |
| 5,154,424 A * | 10/1992 | Lo | A63B 53/04 473/338 |
| 5,158,296 A | 10/1992 | Lee | |
| 5,213,328 A * | 5/1993 | Long et al. | 473/346 |
| D336,672 S | 6/1993 | Gorman | |
| 5,338,024 A * | 8/1994 | Baum | A63B 53/04 156/510 |
| 5,351,958 A * | 10/1994 | Helmstetter | A63B 53/04 473/345 |
| 5,411,255 A * | 5/1995 | Kurashima | A63B 53/04 473/332 |
| 5,419,560 A | 5/1995 | Bamber | |
| 5,425,535 A | 6/1995 | Gee | |
| 5,447,311 A | 9/1995 | Viollaz et al. | |
| 5,451,056 A * | 9/1995 | Manning | 473/328 |
| D362,884 S | 10/1995 | Blough et al. | |
| D362,885 S | 10/1995 | Blough et al. | |
| D362,887 S | 10/1995 | Blough et al. | |
| D370,514 S | 6/1996 | Blough et al. | |
| 5,540,437 A | 7/1996 | Bamber | |
| 5,637,045 A * | 6/1997 | Igarashi | 473/332 |
| 5,669,830 A | 9/1997 | Bamber | |
| 5,738,596 A | 4/1998 | Meyer | |
| 5,766,091 A | 6/1998 | Humphrey et al. | |
| 5,766,092 A | 6/1998 | Mimeur et al. | |
| 5,827,132 A | 10/1998 | Bamber | |
| D408,485 S | 4/1999 | Takahashi et al. | |
| 5,899,821 A | 5/1999 | Hsu et al. | |
| D421,080 S | 2/2000 | Chen | |
| 6,019,687 A * | 2/2000 | Blowers | A63B 53/04 473/326 |
| D426,276 S | 6/2000 | Besnard et al. | |
| 6,077,171 A | 6/2000 | Yoneyama | |
| 6,162,133 A * | 12/2000 | Peterson | A63B 53/04 473/345 |
| 6,180,722 B1 | 1/2001 | Dalton et al. | |
| 6,290,609 B1 | 9/2001 | Takeda | |
| D458,328 S | 6/2002 | Solheim et al. | |
| 6,406,379 B1 * | 6/2002 | Christensen | A63B 53/0487 473/251 |
| D469,833 S | 2/2003 | Roberts et al. | |
| 6,533,681 B2 * | 3/2003 | Inoue | A63B 53/04 473/342 |
| D473,605 S | 4/2003 | Petersen et al. | |
| 6,554,048 B1 * | 4/2003 | Jella | E06B 3/485 160/229.1 |
| D475,107 S | 5/2003 | Madore | |
| 6,695,714 B1 | 2/2004 | Bliss et al. | |
| 6,702,693 B2 | 3/2004 | Bamber | |
| D492,376 S | 6/2004 | Nicolette et al. | |
| D494,240 S | 8/2004 | Schweigert | |
| D494,648 S | 8/2004 | Schweigert et al. | |
| 6,780,123 B2 * | 8/2004 | Hasebe | 473/291 |
| D497,963 S | 11/2004 | Toulon et al. | |
| 6,811,496 B2 | 11/2004 | Wahl et al. | |
| D500,350 S | 12/2004 | Schweigert et al. | |
| D500,351 S | 12/2004 | Schweigert et al. | |
| D502,237 S | 2/2005 | Schweigert et al. | |
| D502,975 S | 3/2005 | Schweigert et al. | |
| D503,204 S | 3/2005 | Nicolette et al. | |
| D504,925 S | 5/2005 | Schweigert et al. | |
| D505,171 S | 5/2005 | Schweigert et al. | |
| D507,320 S | 7/2005 | Roberts et al. | |
| D507,614 S | 7/2005 | Schweigert et al. | |
| D508,099 S | 8/2005 | Schweigert et al. | |
| D508,545 S | 8/2005 | Roberts et al. | |
| 6,949,031 B2 * | 9/2005 | Imamoto | A63B 53/04 473/329 |
| D514,183 S | 1/2006 | Schweigert et al. | |
| D516,650 S | 3/2006 | Wolfe et al. | |
| 7,037,213 B2 | 5/2006 | Otoguro | |
| D523,501 S | 6/2006 | Nicolette et al. | |
| D523,917 S | 6/2006 | Wolfe et al. | |
| 7,084,210 B2 * | 8/2006 | Eagle | B32B 15/08 521/178 |
| D530,759 S | 10/2006 | Nicolette et al. | |
| D530,760 S | 10/2006 | Schweigert et al. | |
| 7,121,956 B2 | 10/2006 | Lo | |
| 7,128,663 B2 | 10/2006 | Bamber | |
| D532,849 S | 11/2006 | Nicolette et al. | |
| D534,228 S | 12/2006 | Nicolette et al. | |
| 7,153,222 B2 * | 12/2006 | Gilbert | A63B 53/047 473/290 |
| D534,595 S | 1/2007 | Hasebe | |
| D534,597 S | 1/2007 | Nicolette et al. | |
| D536,759 S | 2/2007 | Schweigert et al. | |
| D537,494 S | 2/2007 | Jertson et al. | |

(56) References Cited

U.S. PATENT DOCUMENTS

| | | |
|---|---|---|
| 7,182,698 B2 | 2/2007 | Tseng |
| D538,366 S | 3/2007 | Nicolette et al. |
| D539,864 S | 4/2007 | Nicolette et al. |
| D540,898 S | 4/2007 | Solheim et al. |
| D541,360 S | 4/2007 | Schweigert et al. |
| 7,207,900 B2 | 4/2007 | Nicolette et al. |
| D543,601 S | 5/2007 | Kawami |
| D544,056 S | 6/2007 | Nicolette et al. |
| D547,410 S | 7/2007 | Nicolette et al. |
| 7,247,104 B2 * | 7/2007 | Poynor .............. A63B 53/0466 473/329 |
| D555,219 S | 11/2007 | Lin |
| 7,303,486 B2 | 12/2007 | Imamoto |
| D561,855 S | 2/2008 | Schweigert et al. |
| D562,925 S | 2/2008 | Schweigert et al. |
| 7,351,164 B2 | 4/2008 | Schweigert et al. |
| D570,435 S | 6/2008 | Sanchez et al. |
| D570,935 S | 6/2008 | Nicolette et al. |
| D570,936 S | 6/2008 | Schweigert et al. |
| D570,942 S | 6/2008 | Chen et al. |
| D571,422 S | 6/2008 | Schweigert et al. |
| D571,425 S | 6/2008 | Chen et al. |
| D571,427 S | 6/2008 | Schweigert et al. |
| D571,881 S | 6/2008 | Nicolette et al. |
| D572,326 S | 7/2008 | Schweigert et al. |
| D572,329 S | 7/2008 | Nicolette et al. |
| D573,219 S | 7/2008 | Schweigert et al. |
| 7,396,299 B2 | 7/2008 | Nicolette et al. |
| 7,413,518 B2 | 8/2008 | Cole et al. |
| D577,783 S | 9/2008 | Schweigert et al. |
| D578,590 S | 10/2008 | Schweigert et al. |
| D581,000 S | 11/2008 | Nicolette et al. |
| D581,004 S | 11/2008 | Schweigert et al. |
| D584,370 S | 1/2009 | Cleveland et al. |
| D596,256 S | 7/2009 | Schweigert et al. |
| D596,257 S | 7/2009 | Jertson et al. |
| D596,258 S | 7/2009 | Jertson et al. |
| D596,688 S | 7/2009 | Schweigert et al. |
| D597,158 S | 7/2009 | Schweigert et al. |
| 7,559,854 B2 * | 7/2009 | Harvell .............. A63B 53/0466 473/334 |
| D601,216 S | 9/2009 | Jertson et al. |
| 7,588,502 B2 | 9/2009 | Nishino |
| 7,601,075 B2 | 10/2009 | Cole et al. |
| D604,783 S | 11/2009 | Nicolette et al. |
| 7,611,424 B2 | 11/2009 | Nagai et al. |
| 7,658,686 B2 * | 2/2010 | Soracco ........................ 473/342 |
| D618,293 S | 6/2010 | Foster et al. |
| 7,736,243 B2 | 6/2010 | Sanchez et al. |
| 7,744,484 B1 | 6/2010 | Chao |
| D621,893 S | 8/2010 | Nicolette et al. |
| D621,894 S | 8/2010 | Schweigert |
| D621,895 S | 8/2010 | Schweigert et al. |
| 7,766,765 B2 * | 8/2010 | Oyama .............. A63B 53/0466 473/345 |
| D627,409 S | 11/2010 | Schweigert et al. |
| D627,410 S | 11/2010 | Nicolette et al. |
| D635,627 S | 4/2011 | Nicolette |
| 7,938,738 B2 | 5/2011 | Roach |
| D642,642 S | 8/2011 | Jertson et al. |
| D643,491 S | 8/2011 | Stokke et al. |
| D643,492 S | 8/2011 | Nicolette et al. |
| D643,896 S | 8/2011 | Jertson et al. |
| D647,582 S | 10/2011 | Nicolette et al. |
| D649,211 S | 11/2011 | Jertson et al. |
| 8,062,150 B2 | 11/2011 | Gilbert et al. |
| D651,268 S | 12/2011 | Nicolette et al. |
| 8,088,025 B2 | 1/2012 | Wahl et al. |
| 8,092,319 B1 | 1/2012 | Cackett et al. |
| 8,105,180 B1 | 1/2012 | Cackett et al. |
| 8,142,307 B2 | 3/2012 | Sanchez et al. |
| 8,221,262 B1 | 7/2012 | Cackett et al. |
| 8,246,487 B1 | 8/2012 | Cackett et al. |
| D670,775 S | 11/2012 | Jertson et al. |
| D672,417 S | 12/2012 | Jertson et al. |
| D673,633 S | 1/2013 | Jertson et al. |
| D673,634 S | 1/2013 | Jertson et al. |
| 8,376,878 B2 | 2/2013 | Bennett et al. |
| D680,603 S | 4/2013 | Nicolette et al. |
| D681,142 S | 4/2013 | Fossum et al. |
| D681,143 S | 4/2013 | Nicolette et al. |
| 8,414,422 B2 | 4/2013 | Peralta et al. |
| 8,506,420 B2 | 8/2013 | Hocknell et al. |
| 8,574,094 B2 | 11/2013 | Nicolette et al. |
| 8,657,700 B2 | 2/2014 | Nicolette et al. |
| 8,663,026 B2 * | 3/2014 | Blowers et al. .............. 473/326 |
| 8,690,710 B2 | 4/2014 | Nicolette et al. |
| 8,753,230 B2 | 6/2014 | Stokke et al. |
| D708,688 S | 7/2014 | Nicolette et al. |
| 8,900,072 B1 | 12/2014 | Willett et al. |
| D722,352 S | 2/2015 | Nicolette et al. |
| D723,120 S | 2/2015 | Nicolette |
| 8,961,336 B1 * | 2/2015 | Parsons et al. .............. 473/332 |
| D726,265 S | 4/2015 | Nicolette |
| 9,192,830 B2 | 11/2015 | Parsons et al. |
| 9,199,143 B1 | 12/2015 | Parsons et al. |
| 9,233,283 B2 | 1/2016 | Schweigert |
| 2002/0094884 A1 * | 7/2002 | Hocknell .............. A63B 53/02 473/334 |
| 2002/0107087 A1 | 8/2002 | Fagot |
| 2002/0160854 A1 * | 10/2002 | Beach .............. A63B 53/04 473/334 |
| 2003/0144078 A1 * | 7/2003 | Setokawa .......... A63B 53/0466 473/345 |
| 2003/0176231 A1 | 9/2003 | Hasebe |
| 2003/0228928 A1 * | 12/2003 | Yabu .............. A63B 53/04 473/290 |
| 2004/0204263 A1 | 10/2004 | Fagot et al. |
| 2005/0009632 A1 | 1/2005 | Schweigert et al. |
| 2005/0014573 A1 | 1/2005 | Lee |
| 2005/0096148 A1 | 5/2005 | Noble et al. |
| 2005/0119066 A1 | 6/2005 | Stites et al. |
| 2005/0239569 A1 * | 10/2005 | Best et al. ..................... 473/290 |
| 2005/0277485 A1 | 12/2005 | Hou et al. |
| 2005/0279910 A1 * | 12/2005 | Huprikar .............. F16F 1/37 248/636 |
| 2006/0111200 A1 * | 5/2006 | Poynor ........................ 473/346 |
| 2007/0010347 A1 * | 1/2007 | Galloway .......... A63B 53/0466 473/334 |
| 2007/0032308 A1 | 2/2007 | Fagot et al. |
| 2007/0225084 A1 | 9/2007 | Schweigert et al. |
| 2008/0058113 A1 | 3/2008 | Nicolette et al. |
| 2008/0188322 A1 * | 8/2008 | Anderson et al. ............. 473/346 |
| 2008/0300065 A1 | 12/2008 | Schweigert |
| 2009/0029790 A1 | 1/2009 | Nicolette et al. |
| 2009/0191979 A1 | 7/2009 | Hou et al. |
| 2010/0130306 A1 | 5/2010 | Schweigert |
| 2010/0178999 A1 | 7/2010 | Nicolette et al. |
| 2011/0111883 A1 | 5/2011 | Cackett |
| 2011/0165963 A1 | 7/2011 | Cackett et al. |
| 2011/0281665 A1 | 11/2011 | Kawaguchi et al. |
| 2013/0137532 A1 | 5/2013 | Deshmukh et al. |
| 2013/0288823 A1 | 10/2013 | Hebreo |
| 2013/0310192 A1 | 11/2013 | Wahl et al. |
| 2014/0080621 A1 | 3/2014 | Nicolette et al. |
| 2014/0128175 A1 | 5/2014 | Jertson et al. |
| 2016/0030816 A1 | 2/2016 | Schweigert |

OTHER PUBLICATIONS

U.S. Appl. No. 29/511,482, Nicolette et al., "Golf Club Head," filed Dec. 11, 2014.
U.S. Appl. No. 29/512,313, Nicolette, "Golf Club Head," filed Dec. 18, 2014.
U.S. Appl. No. 14/589,277, Parsons et al., "Golf Club Heads and Methods to Manufacture Golf Club Heads," filed Jan. 5, 2015.
U.S. Appl. No. 29/514,256, Nicolette et al., "Golf Club Head," filed Jan. 9, 2015.
U.S. Appl. No. 29/515,013, Nicolette et al., "Golf Club Head," filed Jan. 20, 2015.
U.S. Appl. No. 14/618,479, Parsons et al., "Golf Club Heads and Methods to Manufacture Golf Club Heads," filed Feb. 10, 2015.

(56) References Cited

OTHER PUBLICATIONS

U.S. Appl. No. 14/618,501, Parsons et al., "Golf Club Heads and Methods to Manufacture Golf Club Heads," filed Feb. 10, 2015.
U.S. Appl. No. 14/627,774, Parsons et al., "Golf Club Heads and Methods to Manufacture Golf Club Heads," filed 20, 2015.
International Search Report and Written Opinion received in connection with PCT Application PCT/US16/017852 on Oct. 24, 2016.
International Search Report and Written Opinion received in connection with PCT Application PCT/US2016/017854 on Jun. 9, 2016.

* cited by examiner

GOLF CLUB HEADS AND METHODS TO MANUFACTURE GOLF CLUB HEADS

CROSS REFERENCE

This application claims the benefit of U.S. Provisional Application No. 61/992,555, filed May 13, 2014, U.S. Provisional Application No. 62/010,836, Jun. 11, 2014, U.S. Provisional Application No. 62/011,859, filed Jun. 13, 2014, U.S. Provisional Application No. 62/032,770, filed Aug. 4, 2014, U.S. Provisional Application No. 62/041,538, filed Aug. 25, 2014, U.S. Provisional Application No. U.S. Provisional Application No. 62/118,403, filed Feb. 19, 2015, and U.S. Provisional Application No. 62/159,856, filed May 11, 2015. This application is a continuation-in-part application of U.S. Non-Provisional application Ser. No. 14/589,277, filed Jan. 5, 2015, which is a continuation application of U.S. Non-Provisional application Ser. No. 14/513,073, filed Oct. 13, 2014, which is a continuation application of U.S. Non-Provisional Ser. No. 14/498,603, filed Sep. 26, 2014, which claims the benefit of U.S. Provisional Application No. 62/041,538, filed Aug. 25, 2014. This application is also a continuation-in-part application of U.S. application Ser. No. 29/511,482, filed Dec. 11, 2014, which is a divisional application of U.S. application Ser. No. 29/501,006 filed Aug. 29, 2014. This application is also a continuation-in-part application of U.S. application Ser. No. 29/514,256, filed Jan. 9, 2015, which is a continuation-in-part application of U.S. application Ser. No. 29/501,006, filed Aug. 29, 2014. This application is also a continuation-in-part application of U.S. application Ser. No. 29/515,013, filed Jan. 20, 2015, which is a continuation-in-part application of U.S. Ser. No. 29/501,006, filed Aug. 29, 2014. The disclosures of the referenced applications are incorporated herein by reference.

COPYRIGHT AUTHORIZATION

The present disclosure may be subject to copyright protection. The copyright owner has no objection to the facsimile reproduction by anyone of the present disclosure and its related documents, as they appear in the Patent and Trademark Office patent files or records, but otherwise reserves all applicable copyrights.

FIELD

The present disclosure generally relates to golf equipment, and more particularly, to golf club heads and methods to manufacturing golf club heads.

BACKGROUND

Various materials (e.g., steel-based materials, titanium-based materials, tungsten-based materials, etc.) may be used to manufacture golf club heads. By using multiple materials to manufacture golf club heads, the position of the center of gravity (CG) and/or the moment of inertia (MOI) of the golf club heads may be optimized to produce certain trajectory and spin rate of a golf ball.

Figure 1:
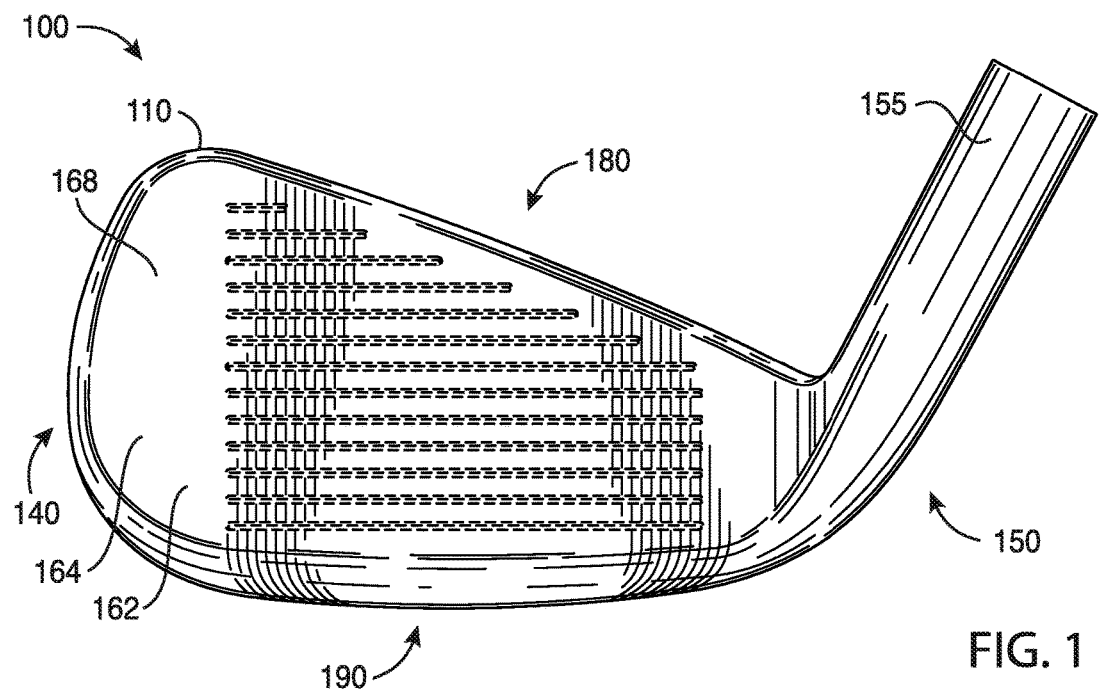
FIG. 1 depicts a front view of a golf club head according to an embodiment of the apparatus, methods, and articles of manufacture described herein.
Figure 2:
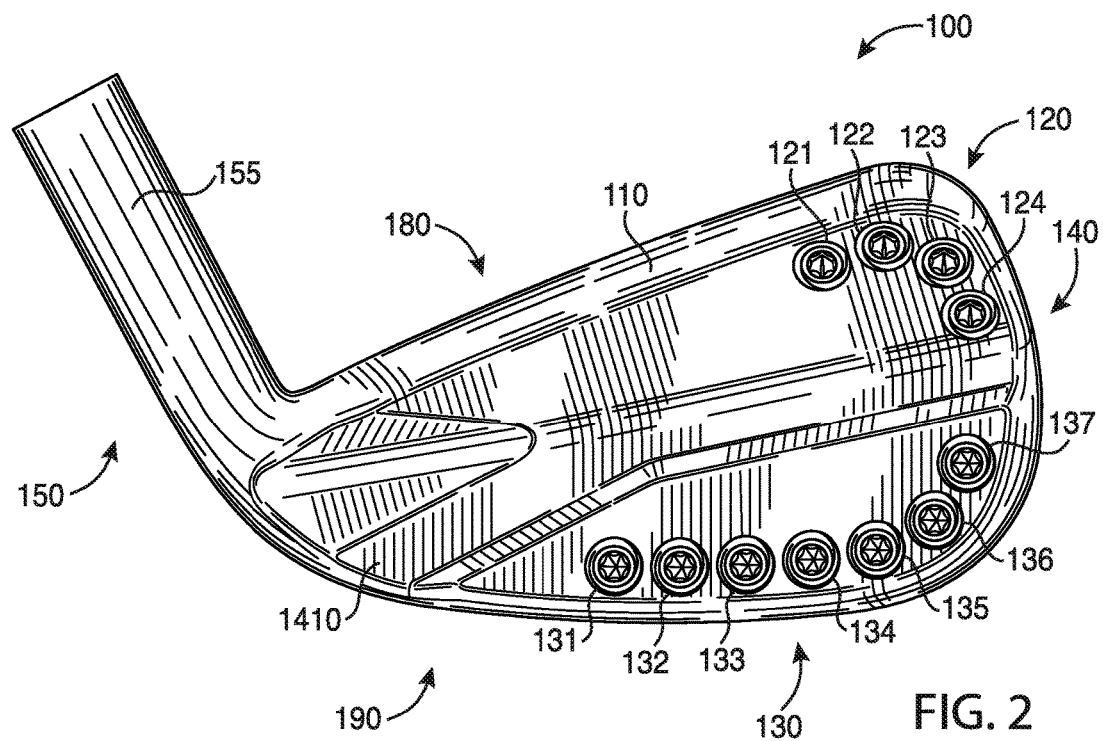
FIG. 2 depicts a rear view of the example golf club head of FIG. 1.
Figure 3:
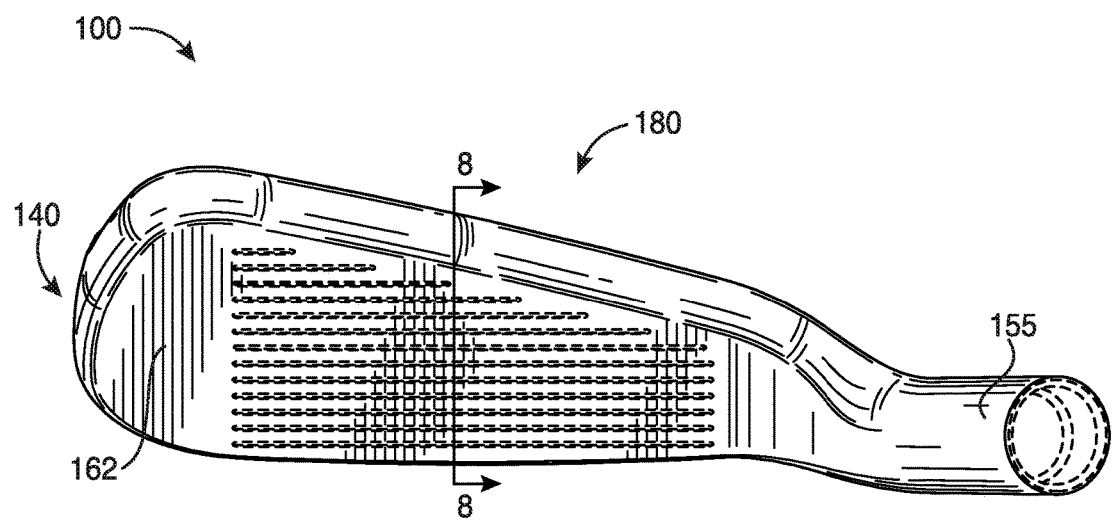
FIG. 3 depicts a top view of the example golf club head of FIG. 1.
Figure 4:
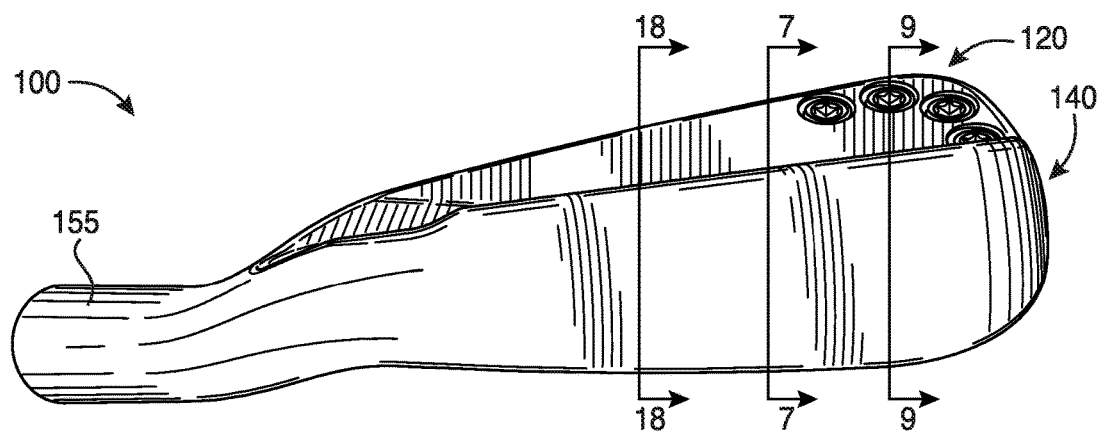
FIG. 4 depicts a bottom view of the example golf club head of FIG. 1.
Figure 5:
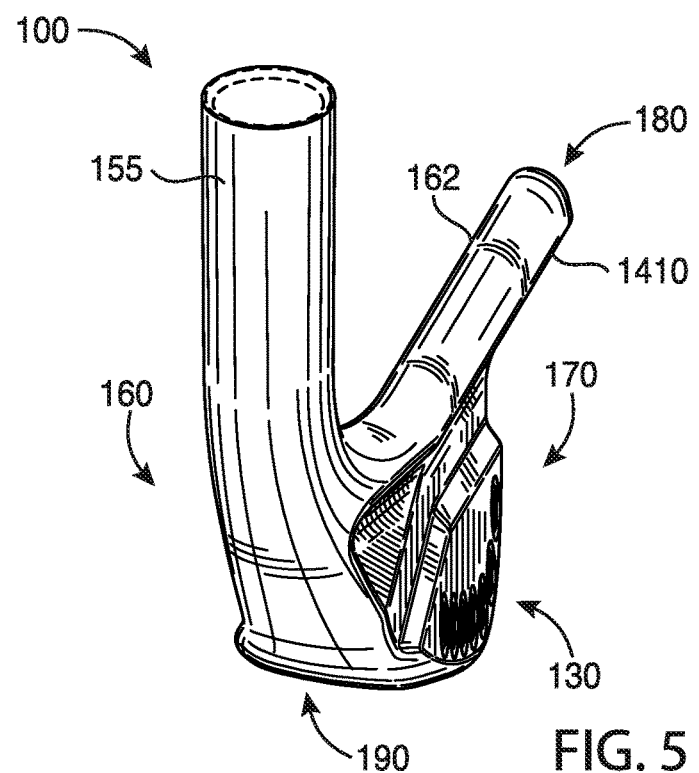
FIG. 5 depicts a left view of the example golf club head of FIG. 1.
Figure 6:
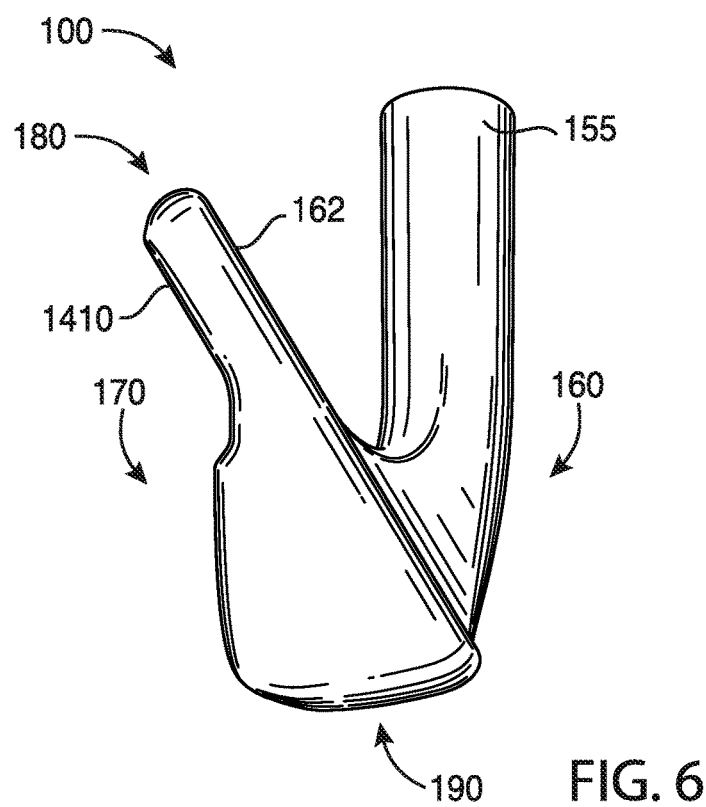
FIG. 6 depicts a right view of the example golf club head of FIG. 1.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures may not be depicted to scale. For example, the dimensions of some of the elements in the figures may be exaggerated relative to other elements to help improve understanding of embodiments of the present disclosure.

DESCRIPTION

In general, golf club heads and methods to manufacture golf club heads are described herein. The apparatus, methods, and articles of manufacture described herein are not limited in this regard.

In the example of FIGS. 1-14, a golf club head 100 may include a body portion 110 (FIG. 14), and two or more weight portions, generally shown as a first set of weight portions 120 (e.g., shown as weight portions 121, 122, 123, and 124) and a second set of weight portions 130 (e.g., shown as weight portions 131, 132, 133, 134, 135, 136, and 137). The body portion 110 may include a toe portion 140, a heel portion 150, a front portion 160, a back portion 170, a top portion 180, and a sole portion 190. The body portion 110 may be made of a first material whereas the first and second sets of weight portions 120 and 130, respectively, may be made of a second material. The first and second materials may be similar or different materials. For example, the body portion 110 may be partially or entirely made of a steel-based material (e.g., 17-4 PH stainless steel, Nitronic® 50 stainless steel, maraging steel or other types of stainless steel), a titanium-based material, an aluminum-based material (e.g., a high-strength aluminum alloy or a composite aluminum alloy coated with a high-strength alloy), any combination thereof, and/or other suitable types of materials. The first and second sets of weight portions 120 and 130, respectively, may be partially or entirely made of a high-density material such as a tungsten-based material or other suitable types of materials. Alternatively, the body portion 110 and/or the first and second sets of weight portions 120 and 130, respectively, may be partially or entirely made of a non-metal material (e.g., composite, plastic, etc.). The apparatus, methods, and articles of manufacture are not limited in this regard.

The golf club head 100 may be an iron-type golf club head (e.g., a 1-iron, a 2-iron, a 3-iron, a 4-iron, a 5-iron, a 6-iron, a 7-iron, an 8-iron, a 9-iron, etc.) or a wedge-type golf club head (e.g., a pitching wedge, a lob wedge, a sand wedge, an n-degree wedge such as 44 degrees (°), 48°, 52°, 56°, 60°, etc.). Although FIGS. 1-10 may depict a particular type of club head, the apparatus, methods, and articles of manufacture described herein may be applicable to other types of club heads (e.g., a driver-type club head, a fairway wood-type club head, a hybrid-type club head, a putter-type club head, etc.). The apparatus, methods, and articles of manufacture described herein are not limited in this regard.

The toe portion 140 and the heel portion 150 may be on opposite ends of the body portion 110. The heel portion 150 may include a hosel portion 155 configured to receive a shaft (not shown) with a grip (not shown) on one end and the golf club head 100 on the opposite end of the shaft to form a golf club.

The front portion 160 may include a face portion 162 (e.g., a strike face). The face portion 162 may include a front surface 164 and a back surface 166. The front surface 164 may include one or more grooves 168 extending between the toe portion 140 and the heel portion 150. While the figures may depict a particular number of grooves, the apparatus, methods, and articles of manufacture described herein may include more or less grooves. The face portion 162 may be used to impact a golf ball (not shown). The face portion 162 may be an integral portion of the body portion 110. Alternatively, the face portion 162 may be a separate piece or an insert coupled to the body portion 110 via various manufacturing methods and/or processes (e.g., a bonding process such as adhesive, a welding process such as laser welding, a brazing process, a soldering process, a fusing process, a mechanical locking or connecting method, any combination thereof, or other suitable types of manufacturing methods and/or processes). The face portion 162 may be associated with a loft plane that defines the loft angle of the golf club head 100. The loft angle may vary based on the type of golf club (e.g., a long iron, a middle iron, a short iron, a wedge, etc.). In one example, the loft angle may be between five degrees and seventy-five degrees. In another example, the loft angle may be between twenty degrees and sixty degrees. The apparatus, methods, and articles of manufacture described herein are not limited in this regard.

Figure 14:
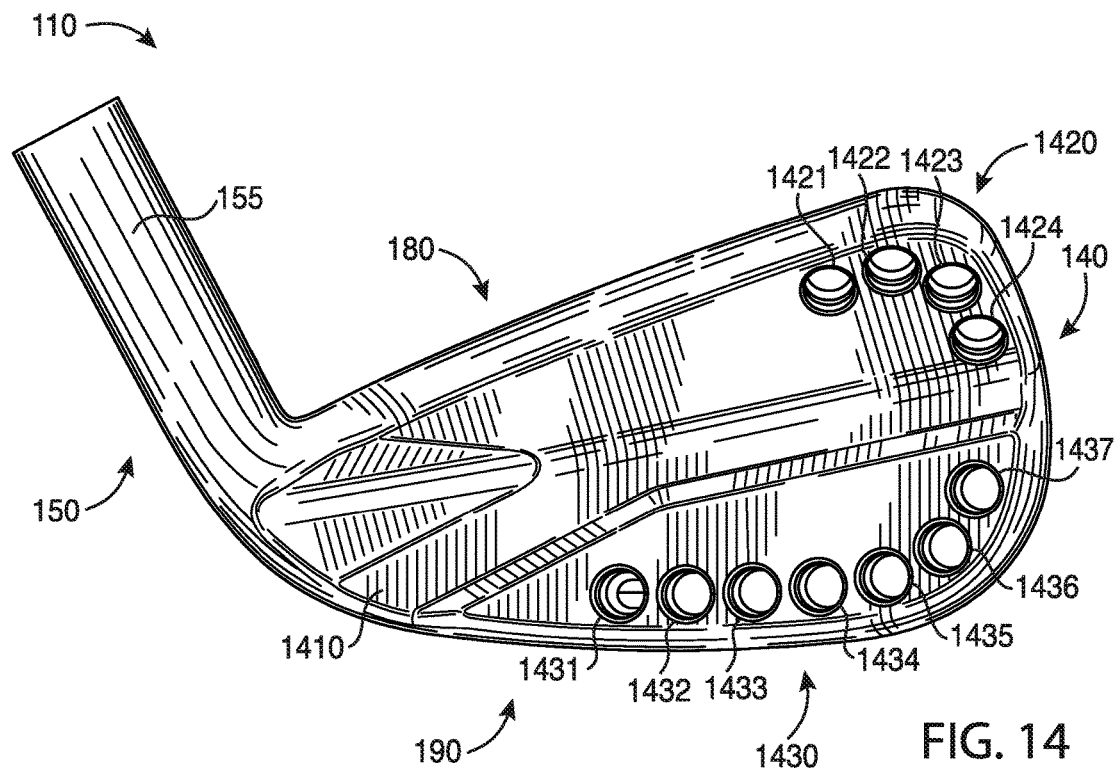
FIG. 14 depicts a rear view of a body portion of the example golf club head of FIG. 1.

As illustrated in FIG. 14, the back portion 170 may include a back wall portion 1410 with one or more exterior weight ports along a periphery of the back portion 170, generally shown as a first set of exterior weight ports 1420 (e.g., shown as weight ports 1421, 1422, 1423, and 1424) and a second set of exterior weight ports 1430 (e.g., shown as weight ports 1431, 1432, 1433, 1434, 1435, 1436, and 1437). Each exterior weight port may be associated with a port diameter. In one example, the port diameter may be about 0.25 inch (6.35 millimeters). Any two adjacent exterior weight ports of the first set of exterior weight ports 1420 may be separated by less than the port diameter. In a similar manner, any two adjacent exterior weight ports of the second set of exterior weight ports 1430 may be separated by less than the port diameter. The first and second exterior weight ports 1420 and 1430 may be exterior weight ports configured to receive one or more weight portions. In particular, each weight portion of the first set 120 (e.g., shown as weight portions 121, 122, 123, and 124) may be disposed in a weight port located at or proximate to the toe portion 140 and/or the top portion 180 on the back portion 170. For example, the weight portion 121 may be partially or entirely disposed in the weight port 1421. In another example, the weight portion 122 may be disposed in a weight port 1422 located in a transition region between the top portion 180 and the toe portion 140 (e.g., a top-and-toe transition region). Each weight portion of the second set 130 (e.g., shown as weight portions 131, 132, 133, 134, 135, 136, and 137) may be disposed in a weight port located at or proximate to the toe portion 140 and/or the sole portion 190 on the back portion 170. For example, the weight portion 135 may be partially or entirely disposed in the weight port 1435. In another example, the weight portion 136 may be disposed in a weight port 1436 located in a transition region between the sole portion 190 and the toe portion 140 (e.g., a sole-and-toe transition region). As described in detail below, the first and second sets of weight portions 120 and 130, respectively, may be coupled to the back portion 170 of the body portion 110 with various manufacturing methods and/or processes (e.g., a bonding process, a welding process, a brazing process, a mechanical locking method, any combination thereof, or other suitable manufacturing methods and/or processes).

Alternatively, the golf club head 100 may not include (i) the first set of weight portions 120, (ii) the second set of weight portions 130, or (iii) both the first and second sets of weight portions 120 and 130. In particular, the back portion 170 of the body portion 110 may not include weight ports at or proximate to the top portion 170 and/or the sole portion 190. For example, the mass of the first set of weight portions 120 (e.g., 3 grams) and/or the mass of the second set of weight portions 130 (e.g., 16.8 grams) may be integral part(s) the body portion 110 instead of separate weight portion(s). The apparatus, methods, and articles of manufacture described herein are not limited in this regard.

Figure 11:
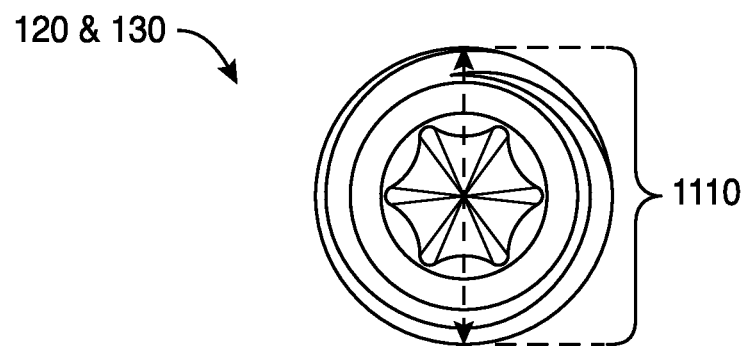
FIG. 11 depicts a top view of a weight portion associated with the example golf club head of FIG. 1.

The first and second sets of weight portions 120 and 130, respectively, may have similar or different physical properties (e.g., color, shape, size, density, mass, volume, etc.). As a result, the first and second sets of weight portions 120 and 130, respectively, may contribute to the ornamental design of the golf club head 100. In the illustrated example as shown in FIG. 11, each of the weight portions of the first and second sets 120 and 130, respectively, may have a cylindrical shape (e.g., a circular cross section). Alternatively, each of the weight portions of the first set 120 may have a first shape (e.g., a cylindrical shape) whereas each of the weight portions of the second set 130 may have a second shape (e.g., a cubical shape). In another example, the first set of weight portions 120 may include two or more weight portions with different shapes (e.g., the weight portion 121 may be a first shape whereas the weight portion 122 may be a second shape different from the first shape). Likewise, the second set of weight portions 130 may also include two or more weight portions with different shapes (e.g., the weight portion 131 may be a first shape whereas the weight portion 132 may be a second shape different from the first shape). Although the above examples may describe weight portions having a particular shape, the apparatus, methods, and articles of manufacture described herein may include weight portions of other suitable shapes (e.g., a portion of or a whole sphere, cube, cone, cylinder, pyramid, cuboidal, prism, frustum, or other suitable geometric shape). While the above examples and figures may depict multiple weight portions as a set of weight portions, each set of the first and second sets of weight portions 120 and 130, respectively, may be a single piece of weight portion. In one example, the first set of weight portions 120 may be a single piece of weight portion instead of a series of four separate weight portions. In another example, the second set of weight portions 130 may be a single piece of weight portion instead of a series of seven separate weight portions. The apparatus, methods, and articles of manufacture described herein are not limited in this regard.

Figure 12:
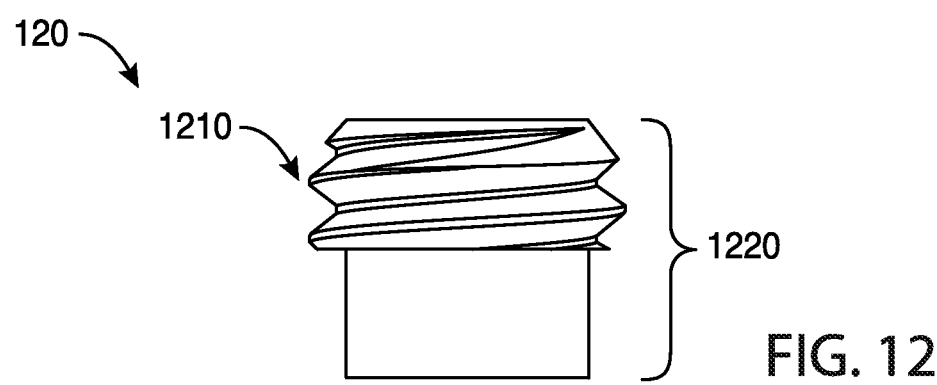
FIG. 12 depicts a side view of a weight portion associated with the example golf club head of FIG. 1.
Figure 13:
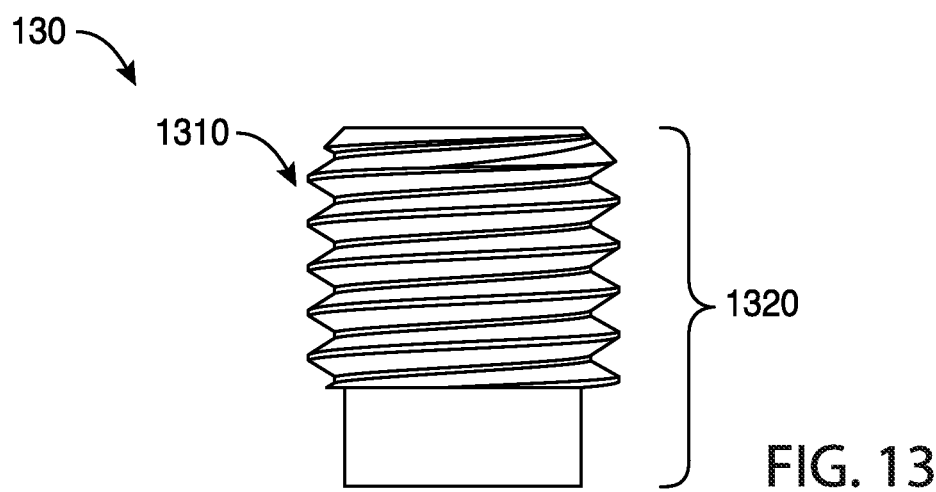
FIG. 13 depicts a side view of another weight portion associated with the example golf club head of FIG. 1.

Referring to FIGS. 12 and 13, for example, the first and second sets of weight portions 120 and 130, respectively, may include threads, generally shown as 1210 and 1310, respectively, to engage with correspondingly configured threads in the weight ports to secure in the weight ports of the back portion 170 (generally shown as 1420 and 1430 in FIG. 14). For example, each weight portion of the first and second sets of weight portions 120 and 130, respectively, may be a screw. The first and second sets of weight portions 120 and 130, respectively, may not be readily removable from the body portion 110 with or without a tool. Alternatively, the first and second sets of weight portions 120 and 130, respectively, may be readily removable (e.g., with a tool) so that a relatively heavier or lighter weight portion may replace one or more of the weight portions of the first and second sets 120 and 130, respectively. In another example, the first and second sets of weight portions 120 and 130, respectively, may be secured in the weight ports of the back portion 170 with epoxy or adhesive so that the first and second sets of weight portions 120 and 130, respectively, may not be readily removable. In yet another example, the first and second sets of weight portions 120 and 130, respectively, may be secured in the weight ports of the back portion 170 with both epoxy and threads so that the first and second sets of weight portions 120 and 130, respectively, may not be readily removable. The apparatus, methods, and articles of manufacture described herein are not limited in this regard.

As mentioned above, the first and second sets of weight portions 120 and 130, respectively, may be similar in some physical properties but different in other physical properties. As illustrated in FIGS. 11-13, for example, each of the weight portions of the first and second sets 120 and 130, respectively, may have a diameter 1110 of about 0.25 inch (6.35 millimeters) but the first and second sets of weight portions 120 and 130, respectively, may be different in height. In particular, each of the weight portions of the first set 120 may be associated with a first height 1220 (FIG. 12), and each of the weight portion of the second set 130 may be associated with a second height 1320 (FIG. 13). The first height 1220 may be relatively shorter than the second height 1320. In one example, the first height 1220 may be about 0.125 inch (3.175 millimeters) whereas the second height 1320 may be about 0.3 inch (7.62 millimeters). In another example, the first height 1220 may be about 0.16 inch (4.064 millimeters) whereas the second height 1320 may be about 0.4 inch (10.16 millimeters). Alternatively, the first height 1220 may be equal to or greater than the second height 1320. The apparatus, methods, and articles of manufacture described herein are not limited in this regard.

Figure 7:
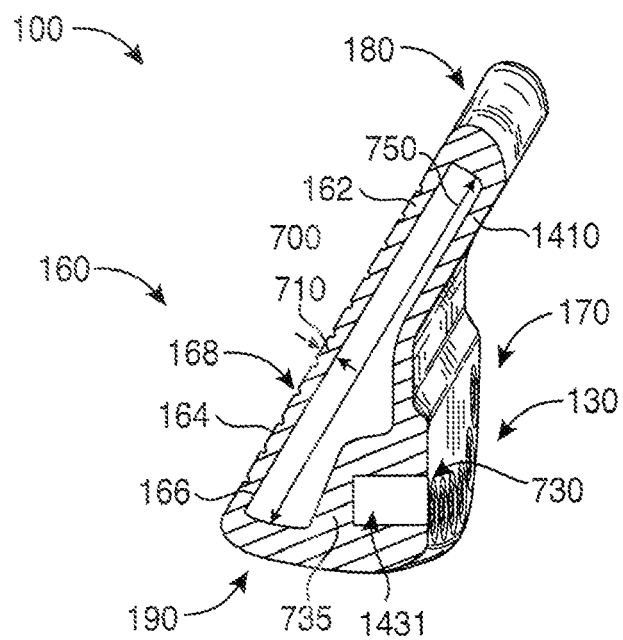
FIG. 7 depicts a cross-sectional view of the example golf club head of FIG. 1 along line 7-7.
Figure 8:
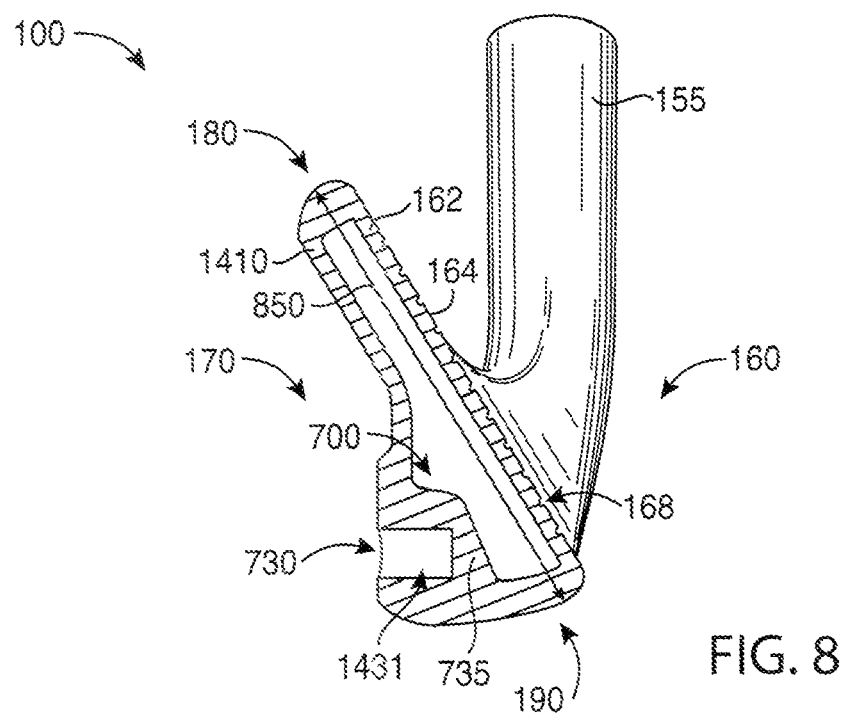
FIG. 8 depicts a cross-sectional view of the example golf club head of FIG. 1 along line 8-8.
Figure 9:
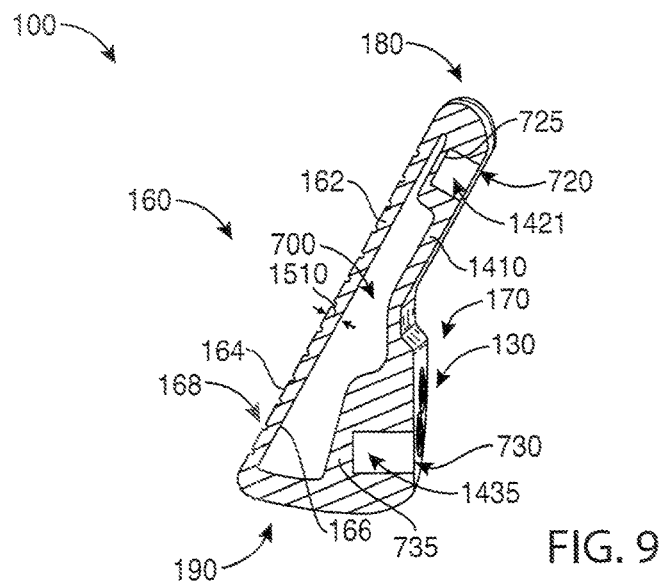
FIG. 9 depicts a cross-sectional view of the example golf club head of FIG. 1 along line 9-9.
Figure 10:
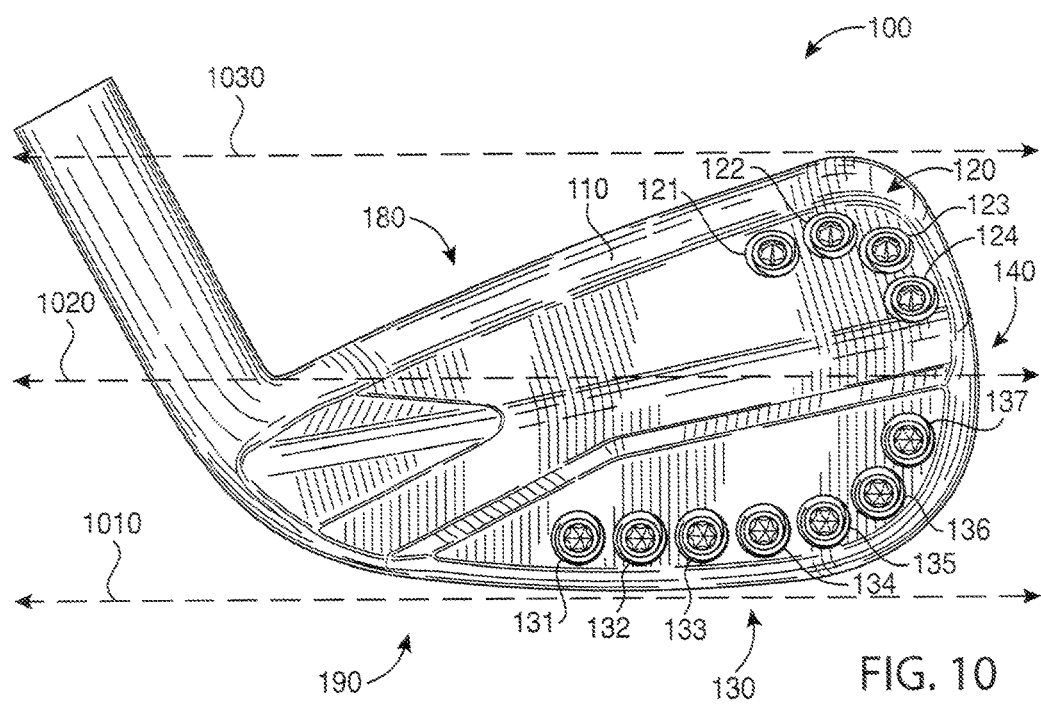
FIG. 10 depicts another rear view of the example golf club head of FIG. 1.

To provide optimal perimeter weighting for the golf club head 100, the first set of weight portions 120 (e.g., weight portions 121, 122, 123, and 124) may be configured to counter-balance the weight of the hosel 155. The second set of weight portions 130 (e.g., weight portions 131, 132, 133, 134, 135, 136, and 137) may be configured to place the center of gravity of the golf club head 100 at an optimal location. Turning to FIGS. 7-9, for example, the first and second sets of weight portions 120 and 130, respectively, may be located away from the back surface 166 of the face portion 162 (e.g., not directly coupled to each other). That is, the first and second sets of weight portions 120 and 130, respectively, and the back surface 166 may be partially or entirely separated by an interior cavity 700 of the body portion 110. As shown in FIG. 14, for example, each exterior weight port of the first and second sets of exterior weight ports 1420 and 1430 may include an opening (e.g., generally shown as 720 and 730) and a port wall (e.g., generally shown as 725 and 735). The port walls 725 and 735 may be integral portions of the back wall portion 1410 (e.g., a section of the back wall portion 1410). Each of the openings 720 and 730 may be configured to receive a weight portion such as weight portions 121 and 135, respectively. The opening 720 may be located at one end of the weight port 1421, and the port wall 725 may be located or proximate to at an opposite end of the weight port 1421. In a similar manner, the opening 730 may be located at one end of the weight port 1435, and the port wall 735 may be located at or proximate to an opposite end of the weight port 1435. The port walls 725 and 735 may be separated from the face portion 162 (e.g., separated by the interior cavity 700). As a result, the center of gravity (CG) of the golf club head 100 may be relatively farther back away from the face portion 162 and relatively lower towards a ground plane (e.g., one shown as 1010 in FIG. 10) with the second set of weight portions 130 being away from the back surface 166 than if the second set of weight portions 130 were directly coupled to the back surface 166. The apparatus, methods, and articles of manufacture described herein are not limited in this regard.

While the figures may depict weight ports with a particular cross-section shape, the apparatus, methods, and articles of manufacture described herein may include weight ports with other suitable cross-section shapes. In one example, the weight ports of the first and/or second sets of weight ports 1420 and 1430 may have U-like cross-section shape. In another example, the weight ports of the first and/or second set of weight ports 1420 and 1430 may have V-like cross-section shape. One or more of the weight ports associated with the first set of weight portions 120 may have a different cross-section shape than one or more weight ports associated with the second set of weight portions 130. For example, the weight port 1421 may have a U-like cross-section shape whereas the weight port 1435 may have a V-like cross-section shape. Further, two or more weight ports associated with the first set of weight portions 120 may have different cross-section shapes. In a similar manner, two or more weight ports associated with the second set of weight portions 130 may have different cross-section shapes. The apparatus, methods, and articles of manufacture described herein are not limited in this regard.

Referring back to FIG. 10, for example, the golf club head 100 may be associated with a ground plane 1010, a horizontal midplane 1020, and a top plane 1030. In particular, the ground plane 1010 may be a tangential plane to the sole portion 190 of the golf club head 100 when the golf club head 100 is at an address position (e.g., the golf club head 100 is aligned to strike a golf ball). A top plane 1030 may be a tangential plane to the top portion of the 180 of the golf club head 100 when the golf club head 100 is at the address position. The ground and top planes 1010 and 1030, respectively, may be substantially parallel to each other. The horizontal midplane 1020 may be vertically halfway between the ground and top planes 1010 and 1030, respectively.

The first and second sets of weight portions 120 and 130, respectively, may be similar in mass (e.g., all of the weight portions of the first and second sets 120 and 130, respectively, weigh about the same). Alternatively, the first and second sets of weight portions 120 and 130, respectively, may be different in mass individually or as an entire set. In particular, each of the weight portions of the first set 120 (e.g., shown as 121, 122, 123, and 124) may have relatively less mass than any of the weight portions of the second set 130 (e.g., shown as 131, 132, 133, 134, 135, 136, and 137). For example, the second set of weight portions 130 may account for more than 50% of the total mass from exterior weight portions of the golf club head 100. As a result, the golf club head 100 may be configured to have at least 50% of the total mass from exterior weight portions disposed below the horizontal midplane 1020. The apparatus, methods, and articles of manufacture described herein are not limited in this regard.

In one example, the golf club head 100 may have a mass in the range of about 220 grams to about 330 grams based on the type of golf club (e.g., a 4-iron versus a lob wedge). The body portion 110 may have a mass in the range of about 200 grams to about 310 grams with the first and second sets of weight portions 120 and 130, respectively, having a mass of about 20 grams (e.g., a total mass from exterior weight portions). Each of the weight portions of the first set 120 may have a mass of about one gram (1.0 g) whereas each of the weight portions of the second set 130 may have a mass of about 2.4 grams. The sum of the mass of the first set of weight portions 120 may be about 3 grams whereas the sum of the mass of the first set of weight portions 130 may be about 16.8 grams. The total mass of the second set of weight portions 130 may weigh more than five times as much as the total mass of the first set of weight portions 120 (e.g., a total mass of the second set of weight portions 130 of about 16.8 grams versus a total mass of the first set of weight portions 120 of about 3 grams). The golf club head 100 may have a total mass of 19.8 grams from the first and second sets of weight portions 120 and 130, respectively (e.g., sum of 3 grams from the first set of weight portions 120 and 16.8 grams from the second set of weight portions 130). Accordingly, the first set of weight portions 120 may account for about 15% of the total mass from exterior weight portions of the golf club head 100 whereas the second set of weight portions 130 may be account for about 85% of the total mass from exterior weight portions of the golf club head 100. The apparatus, methods, and articles of manufacture described herein are not limited in this regard.

By coupling the first and second sets of weight portions 120 and 130, respectively, to the body portion 110 (e.g., securing the first and second sets of weight portions 120 and 130 in the weight ports on the back portion 170), the location of the center of gravity (CG) and the moment of inertia (MOI) of the golf club head 100 may be optimized. In particular, the first and second sets of weight portions 120 and 130, respectively, may lower the location of the CG towards the sole portion 190 and further back away from the face portion 162. Further, the MOI may be higher as measured about a vertical axis extending through the CG (e.g., perpendicular to the ground plane 1010). The MOI may also be higher as measured about a horizontal axis extending through the CG (e.g., extending towards the toe and heel portions 150 and 160, respectively, of the golf club head 100). As a result, the club head 100 may provide a relatively higher launch angle and a relatively lower spin rate than a golf club head without the first and second sets of weight portions 120 and 130, respectively. The apparatus, methods, and articles of manufacture described herein are not limited in this regard.

Alternatively, two or more weight portions in the same set may be different in mass. In one example, the weight portion 121 of the first set 120 may have a relatively lower mass than the weight portion 122 of the first set 120. In another example, the weight portion 131 of the second set 130 may have a relatively lower mass than the weight portion 135 of the second set 130. With relatively greater mass at the top-and-toe transition region and/or the sole-and-toe transition region, more weight may be distributed away from the center of gravity (CG) of the golf club head 100 to increase the moment of inertia (MOI) about the vertical axis through the CG.

Although the figures may depict the weight portions as separate and individual parts, each set of the first and second sets of weight portions 120 and 130, respectively, may be a single piece of weight portion. In one example, all of the weight portions of the first set 120 (e.g., shown as 121, 122, 123, and 124) may be combined into a single piece of weight portion (e.g., a first weight portion). In a similar manner, all of the weight portions of the second set 130 (e.g., 131, 132, 133, 134, 135, 136, and 137) may be combined into a single piece of weight portion as well (e.g., a second weight portion). In this example, the golf club head 100 may have only two weight portions. While the figures may depict a particular number of weight portions, the apparatus, methods, and articles of manufacture described herein may include more or less number of weight portions. In one example, the first set of weight portions 120 may include two separate weight portions instead of three separate weight portions as shown in the figures. In another example, the second set of weight portions 130 may include five separate weight portions instead of seven separate weight portions a shown in the figures. Alternatively as mentioned above, the apparatus, methods, and articles of manufacture described herein may not include any separate weight portions (e.g., the body portion 110 may be manufactured to include the mass of the separate weight portions as integral part(s) of the body portion 110). The apparatus, methods, and articles of manufacture described herein are not limited in this regard.

Referring back to FIGS. 7-9, for example, the body portion 110 may be a hollow body including the interior cavity 700 extending between the front portion 160 and the back portion 170. Further, the interior cavity 700 may extend between the top portion 180 and the sole portion 190. The interior cavity 700 may be associated with a cavity height 750 ($H_C$), and the body portion 110 may be associated with a body height 850 ($H_B$). While the cavity height 750 and the body height 850 may vary between the toe and heel portions 140 and 150, the cavity height 750 may be at least 50% of a body height 850 ($H_C>0.5*H_B$). For example, the cavity height 750 may vary between 70-85% of the body height 850. With the cavity height 750 of the interior cavity 700 being greater than 50% of the body height 850, the golf club head 100 may produce relatively more consistent feel, sound, and/or result when the golf club head 100 strikes a golf ball via the face portion 162 than a golf club head with a cavity height of less than 50% of the body height. The apparatus, methods, and articles of manufacture described herein are not limited in this regard.

In one example, the interior cavity 700 may be unfilled (i.e., empty space). The body portion 100 with the interior cavity 700 may weight about 100 grams less than the body portion 100 without the interior cavity 700. Alternatively, the interior cavity 700 may be partially or entirely filled with an elastic polymer or elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), and/or other suitable types of materials to absorb shock, isolate vibration, and/or dampen noise. For example, at least 50% of the interior cavity 700 may be filled with a TPE material to absorb shock, isolate vibration, and/or dampen noise when the golf club head 100 strikes a golf ball via the face portion 162. The apparatus, methods, and articles of manufacture described herein are not limited in this regard.

Figure 15:
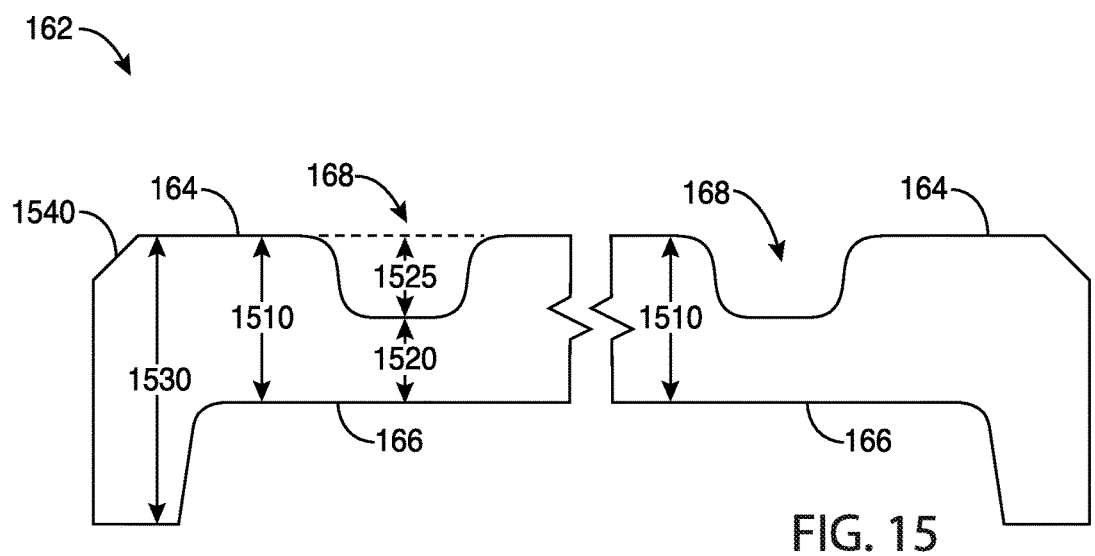
FIG. 15 depicts a cross-sectional view of a face portion of the example golf club head of FIG. 1.

Turning to FIG. 15, for example, the face portion 162 may include a first thickness 1510 ($T_1$), and a second thickness 1520 ($T_2$). The first thickness 1510 may be a thickness of a section of the face portion 162 adjacent to a groove 168 whereas the second thickness 1520 may be a thickness of a section of the face portion 162 below the groove 168. For example, the first thickness 1510 may be a maximum distance between the front surface 164 and the back surface 166. The second thickness 1520 may be based on the groove 168. In particular, the groove 168 may have a groove depth 1525 ($D_{groove}$). The second thickness 1520 may be a maximum distance between the bottom of the groove 168 and the back surface 166. The sum of the second thickness 1520 and the groove depth 1525 may be substantially equal to the first thickness 1510 (e.g., $T_2+D_{groove}=T_1$). Accordingly, the second thickness 1520 may be less than the first thickness 1510 (e.g., $T_2<T_1$).

To lower and/or move the CG of the golf club head 100 further back, weight from the front portion 160 of the golf club head 100 may be removed by using a relatively thinner face portion 162. For example, the first thickness 1510 may be about 0.075 inch (1.905 millimeters) (e.g., $T_1=0.075$ inch). With the support of the back wall portion 1410 to form the interior cavity 700 and filling at least a portion of the interior cavity 700 with an elastic polymer material, the face portion 162 may be relatively thinner (e.g., $T_1<0.075$ inch) without degrading the structural integrity, sound, and/or feel of the golf club head 100. In one example, the first thickness 1510 may be less than or equal to 0.060 inch (1.524 millimeters) (e.g., $T1 \leq 0.060$ inch). In another example, the first thickness 1510 may be less than or equal to 0.040 inch (1.016 millimeters) (e.g., $T_1 \leq 0.040$ inch). Based on the type of material(s) used to form the face portion 162 and/or the body portion 110, the face portion 162 may be even thinner with the first thickness 1510 being less than or equal to 0.030 inch (0.762 millimeters) (e.g., $T_1 \leq 0.030$ inch). The groove depth 1525 may be greater than or equal to the second thickness 1520 (e.g., $D_{groove} \geq T_2$). In one example, the groove depth 1525 may be about 0.020 inch (0.508 millimeters) (e.g., $D_{groove}=0.020$ inch). Accordingly, the second thickness 1520 may be about 0.010 inch (0.254 millimeters) (e.g., $T_2=0.010$ inch). In another example, the groove depth 1525 may be about 0.015 inch (0.381 millimeters), and the second thickness 1520 may be about 0.015 inch (e.g., $D_{groove}=T_2=0.015$ inch). Alternatively, the groove depth 1525 may be less than the second thickness 1520 (e.g., $D_{groove}<T_2$). Without the support of the back wall portion 1410 and the elastic polymer material to fill in the interior cavity 700, a golf club head may not be able to withstand multiple impacts by a golf ball on a face portion. In contrast to the golf club head 100 as described herein, a golf club head with a relatively thin face portion but without the support of the back wall portion 1410 and the elastic polymer material to fill in the interior cavity 700 (e.g., a cavity-back golf club head) may produce unpleasant sound (e.g., a tinny sound) and/or feel during impact with a golf ball. The apparatus, methods, and articles of manufacture described herein are not limited in this regard.

Based on manufacturing processes and methods used to form the golf club head 100, the face portion 162 may include additional material at or proximate to a periphery of the face portion 162. Accordingly, the face portion 162 may also include a third thickness 1530, and a chamfer portion 1540. The third thickness 1530 may be greater than either the first thickness 1510 or the second thickness 1520 (e.g., $T_3>T_1>T_2$). In particular, the face portion 162 may be coupled to the body portion 110 by a welding process. For example, the first thickness 1510 may be about 0.030 inch (0.762 millimeters), the second thickness 1520 may be about 0.015 inch (0.381 millimeters), and the third thickness 1530 may be about 0.050 inch (1.27 millimeters). Accordingly, the chamfer portion 1540 may accommodate some of the additional material when the face portion 162 is welded to the body portion 110.

Figure 16:
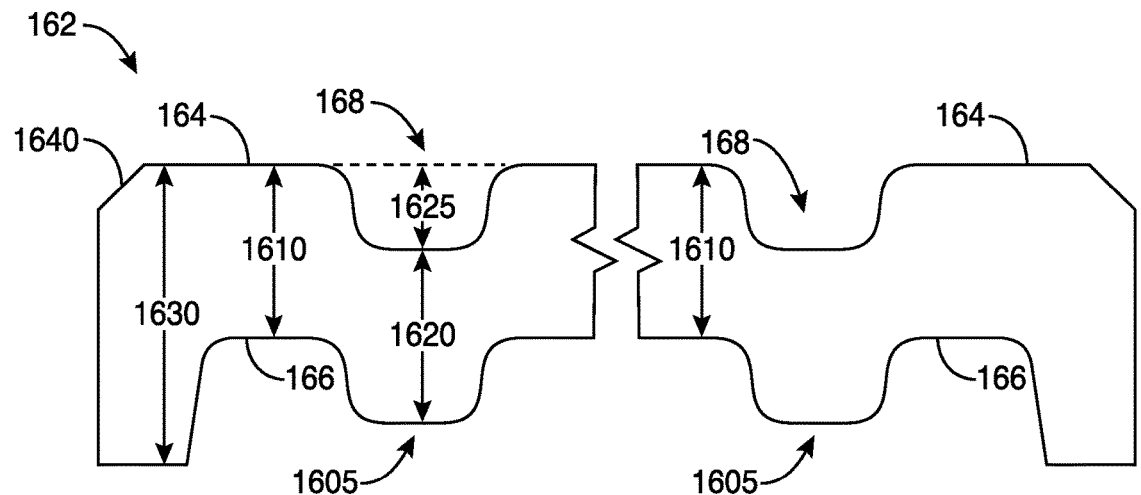
FIG. 16 depicts a cross-sectional view of another face portion of the example golf club head of FIG. 1.

As illustrated in FIG. 16, for example, the face portion 162 may include a reinforcement section, generally shown as 1605, below one or more grooves 168. In one example, the face portion 162 may include a reinforcement section 1605 below each groove. Alternatively, face portion 162 may include the reinforcement section 1605 below some grooves (e.g., every other groove) or below only one groove. The face portion 162 may include a first thickness 1610, a second thickness 1620, a third thickness 1630, and a chamfer portion 1640. The groove 168 may have a groove depth 1625. The reinforcement section 168 may define the second thickness 1620. The first and second thicknesses 1610 and 1620, respectively, may be substantially equal to each other (e.g., $T_1=T_2$). In one example, the first and second thicknesses 1610 and 1620, respectively, may be about 0.030 inch (0.762 millimeters) (e.g., $T_1=T_2=0.030$ inch). The groove depth 1625 may be about 0.015 inch (0.381 millimeters), and the third thickness 1630 may be about 0.050 inch (1.27 millimeters). The groove 168 may also have a groove width. The width of the reinforcement section 1605 may be greater than or equal to the groove width. The apparatus, methods, and articles of manufacture described herein are not limited in this regard.

Alternatively, the face portion 162 may vary in thickness at and/or between the top portion 180 and the sole portion 190. In one example, the face portion 162 may be relatively thicker at or proximate to the top portion 180 than at or proximate to the sole portion 190 (e.g., thickness of the face portion 162 may taper from the top portion 180 towards the sole portion 190). In another example, the face portion 162 may be relatively thicker at or proximate to the sole portion 190 than at or proximate to the top portion 180 (e.g., thickness of the face portion 162 may taper from the sole portion 190 towards the top portion 180). In yet another example, the face portion 162 may be relatively thicker between the top portion 180 and the sole portion 190 than at or proximate to the top portion 180 and the sole portion 190 (e.g., thickness of the face portion 162 may have a bell-shaped contour). The apparatus, methods, and articles of manufacture described herein are not limited in this regard.

Different from other golf club head designs, the interior cavity 700 of the body portion 110 and the location of the first and second sets of weight portions 120 and 130, respectively, along the perimeter of the golf club head 100 may result in a golf ball traveling away from the face portion 162 at a relatively higher ball launch angle and a relatively lower spin rate. As a result, the golf ball may travel farther (i.e., greater total distance, which includes carry and roll distances).

Figure 17:
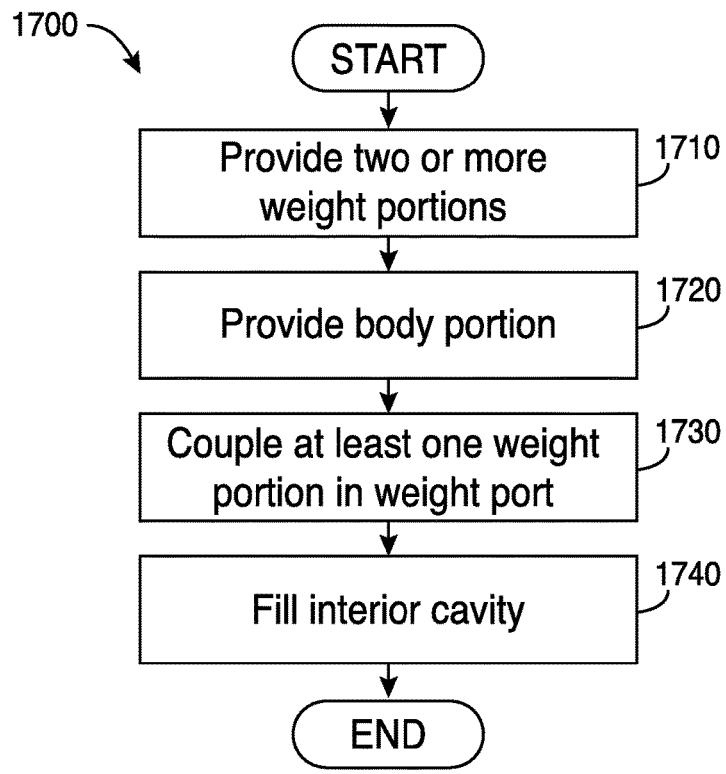
FIG. 17 depicts one manner in which the example golf club head described herein may be manufactured.

FIG. 17 depicts one manner in which the example golf club head described herein may be manufactured. In the example of FIG. 17, the process 1700 may begin with providing two or more weight portions, generally shown as the first and second sets of weight portions 120 and 130, respectively (block 1710). The first and second sets of weight portions 120 and 130, respectively, may be made of a first material such as a tungsten-based material. In one example, the weight portions of the first and second sets 120 and 130, respectively, may be tungsten-alloy screws.

The process 1700 may provide a body portion 110 having the face portion 162, the interior cavity 700, and the back portion 170 with two or more exterior weight ports, generally shown as 1420 and 1430 (block 1720). The body portion 110 may be made of a second material, which is different than the first material. The body portion 110 may be manufacture using an investment casting process, a billet forging process, a stamping process, a computer numerically controlled (CNC) machining process, a die casting process, any combination thereof, or other suitable manufacturing processes. In one example, the body portion 110 may be made of 17-4 PH stainless steel using a casting process. In another example, the body portion 110 may be made of other suitable type of stainless steel (e.g., Nitronic® 50 stainless steel manufactured by AK Steel Corporation, West Chester, Ohio) using a forging process. By using Nitronic® 50 stainless steel to manufacture the body portion 110, the golf club head 100 may be relatively stronger and/or more resistant to corrosion than golf club heads made from other types of steel. Each weight port of the body portion 110 may include an opening and a port wall. For example, the weight port 1421 may include the opening 720 and the port wall 725 with the opening 720 and the port wall 725 being on opposite ends of each other. The interior cavity 700 may separate the port wall 725 of the weight port 1421 and the back surface 166 of the face portion 162. In a similar manner, the weight port 1835 may include the opening 730 and the port wall 735 with the opening 730 and the port wall 735 being on opposite ends of each other. The interior cavity 700 may separate the port wall 735 of the weight port 1435 and the back surface 166 of the face portion 162.

The process 1700 may couple each of the first and second sets of weight portions 120 and 130 into one of the two or more exterior weight ports (blocks 1730). In one example, the process 1700 may insert and secure the weight portion 121 in the exterior weight port 1421, and the weight portion 135 in the exterior weight portion 1435. The process 1700 may use various manufacturing methods and/or processes to secure the first and second sets of weight portions 120 and 130, respectively, in the exterior weigh ports such as the weight ports 1421 and 1435 (e.g., epoxy, welding, brazing, mechanical lock(s), any combination thereof, etc.).

Figure 18:
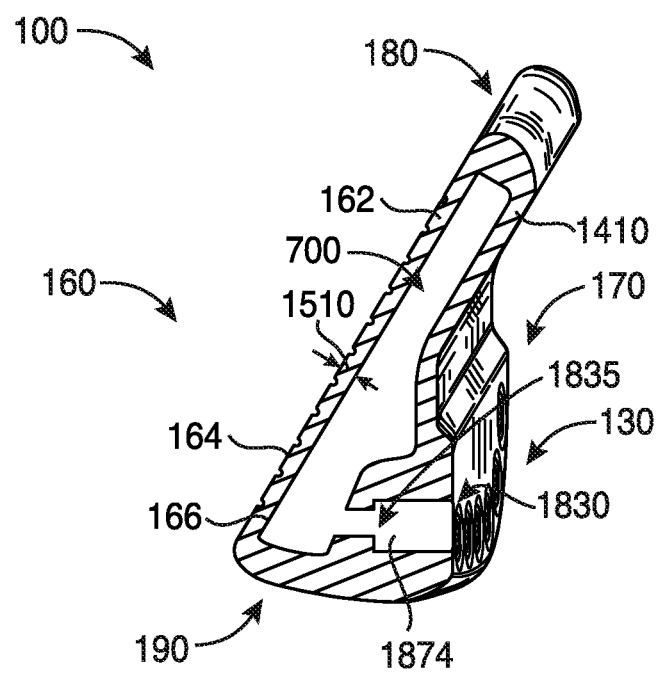
FIG. 18 depicts another cross-sectional view of the example golf club head of FIG. 4 along line 18-18.

The process 1700 may partially or entirely fill the interior cavity 700 with an elastic polymer material (e.g., Sorbothane® material) (block 1740). In one example, at least 50% of the interior cavity 700 may be filled with the elastic polymer material. As mentioned above, the elastic polymer material may absorb shock, isolate vibration, and/or dampen noise in response to the golf club head 100 striking a golf ball. In addition or alternatively, the interior cavity 700 may be filled with a thermoplastic elastomer material and/or a thermoplastic polyurethane material. As illustrated in FIG. 18, for example, the golf club head 100 may include one or more weight ports (e.g., one shown as 1431 in FIG. 14) with a first opening 1830 and a second opening 1835. The second opening 1835 may be used to access the interior cavity 700. In one example, the process 1700 (FIG. 17) may fill the interior cavity 700 with an elastic polymer material by injecting the elastic polymer material into the interior cavity 700 from the first opening 1830 via the second opening 1835. The first and second openings 1830 and 1835, respectively, may be same or different in size and/or shape. While the above example may describe and depict a particular weight port with a second opening, any other weight ports of the golf club head 100 may include a second opening (e.g., the weight port 720). The apparatus, methods, and articles of manufacture described herein are not limited in this regard.

Referring back to FIG. 17, the example process 1700 is merely provided and described in conjunction with other figures as an example of one way to manufacture the golf club head 100. While a particular order of actions is illustrated in FIG. 17, these actions may be performed in other temporal sequences. For example, two or more actions depicted in FIG. 17 may be performed sequentially, concurrently, or simultaneously. In one example, blocks 1710, 1720, 1730, and/or 1740 may be performed simultaneously or concurrently. Although FIG. 17 depicts a particular number of blocks, the process may not perform one or more blocks. In one example, the interior cavity 700 may not be filled (i.e., block 1740 may not be performed). The apparatus, methods, and articles of manufacture described herein are not limited in this regard.

Figure 19:
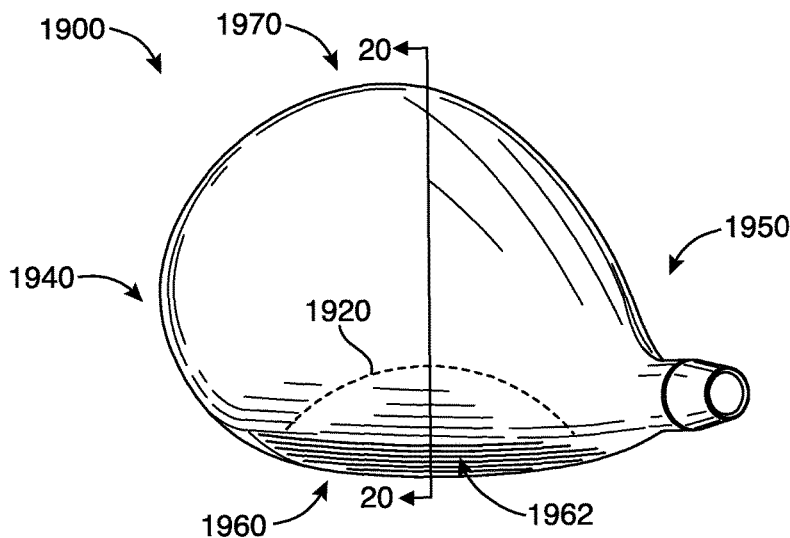
FIG. 19 depicts a top view of a golf club head according to another embodiment of the apparatus, methods, and articles of manufacture described herein.
Figure 20:
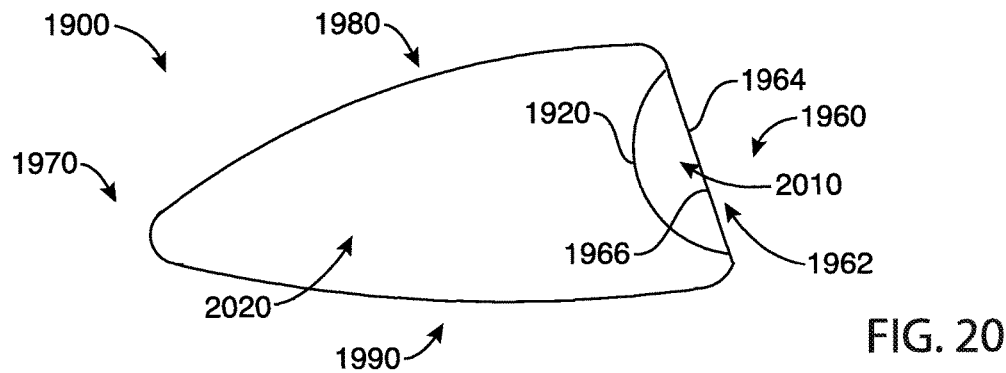
FIG. 20 depicts a cross-sectional view of the example golf club head of FIG. 19 along line 20-20.
Figure 21:
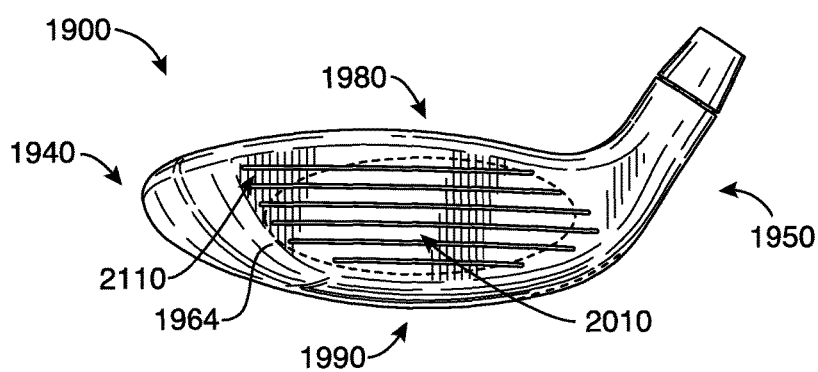
FIG. 21 depicts a front view of the example golf club head of FIG. 19.

While the above examples may described an iron-type or a wedge-type golf club head, the apparatus, methods, and articles of manufacture described herein may be applicable to other types of golf club heads. Referring to FIGS. 19-21, for example, a golf club head 1900 may include a body portion 1910 and a cavity wall portion 1920. The golf club head 1900 may have a club head volume greater than or equal to 300 cubic centimeters (cm$^3$ or cc). In one example, the golf club head 1900 may be about 460 cc. Alternatively, the golf club head 1900 may have a club head volume less than or equal to 300 cc. For example, the golf club head 1900 may have a club head volume between 100 cc and 200 cc. The club head volume of the golf club head 1900 may be determined by using the weighted water displacement method (i.e., Archimedes Principle). For example, procedures defined by golf standard organizations and/or governing bodies such as the United States Golf Association (USGA) and/or the Royal and Ancient Golf Club of St. Andrews (R&A) may be used for measuring the club head volume of the golf club head 100. Although FIGS. 19-21 may depict a particular type of club head (e.g., a fairway wood-type club head), the apparatus, methods, and articles of manufacture described herein may be applicable to other types of club head (e.g., a driver-type club head, a hybrid-type club head, an iron-type club head, a putter-type club head, etc.). The apparatus, methods, and articles of manufacture described herein are not limited in this regard.

The body portion 1910 may include a toe portion 1940, a heel portion 1950, a front portion 1960, a rear portion 1970, a top portion 1980 (e.g., a crown portion), and a bottom portion 1990 (e.g., a sole portion). The body portion 1910 may be a hollow body made partially or entirely of an aluminum-based material, a magnesium-type material, a steel-based material, a titanium-based material, any other suitable material, or any combination thereof. In another example, the body portion 1910 may be made partially or entirely of a non-metal material such as a ceramic material, a composite material, any other suitable material, or any combination thereof. The front portion 1960 may include a face portion 1962 (e.g., a strike face). The face portion 1962 may include a front surface 1964 and a back surface 1966. The front surface 1964 may include a plurality of grooves, generally shown as 2110 in FIG. 21.

The cavity wall portion 1920 may form a first interior cavity 2010 and a second interior cavity 2020 within the body portion 1910. For example, the cavity wall portion 1920 may be made partially or entirely of an aluminum-based material, a steel-based material, any other suitable material, or any combination thereof. In another example, the cavity wall portion 1920 may be made partially or entirely of a non-metal material such as a ceramic material, a composite material, any other suitable material, or any combination thereof. The first interior cavity 2010 may be associated with a first volume, and the second interior cavity 2020 may be associated with a second volume. In one example, the first volume may be less than the second volume. Further, the first volume may be less than or equal to 50% of the second volume.

As illustrated in FIG. 20, for example, the cavity wall portion 1920 may extend from the back surface 1966 of the face portion 1962. In one example, the cavity wall portion 1920 may extend no more than one inch from the back surface 1966. In another example, the cavity wall portion 1920 may extend no more than two inches from the back surface 1966. The cavity wall portion 1920 may be a single curved wall section. In particular, the cavity wall portion 1920 may have a convex arc profile relative to the back surface 1966 (e.g., C shape) to form a dome-like structure with an elliptical base (e.g., FIG. 21) or a circular base on the back surface 1966. In another example, the cavity wall portion 1920 may form a cone-like structure or a cylinder-like structure with the body portion 1910. Alternatively, the cavity wall portion 1920 may be a concave arc profile relative to the back surface 1966. The apparatus, methods, and articles of manufacture described herein are not limited in this regard.

The first interior cavity 2010 may be partially or entirely filled with an elastic polymer or elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), and/or other suitable types of materials to absorb shock, isolate vibration, dampen noise, and/or provide structural support. The elastic polymer material may be injected into the first interior cavity 2010 via an injection molding process via a port on the face portion 1962. For example, at least 50% of the first interior cavity 2010 may be filled with a TPE material to absorb shock, isolate vibration, dampen noise, and/or provide structural support when the golf club head 1900 strikes a golf ball via the face portion 1962. With the support of the cavity wall portion 1920 to form the first interior cavity 2010 and filling at least a portion of the first interior cavity 2010 with an elastic polymer material, the face portion 1962 may be relatively thin without degrading the structural integrity, sound, and/or feel of the golf club head 1900. In one example, the face portion 1962 may have a thickness of less than or equal to 0.075 inch (e.g., a distance between the front surface 1964 and the back surface 1966). In another example, the face portion 1962 may have a thickness of less than or equal to 0.060 inch. In yet another example, the face portion 1962 may have a thickness of less than or equal to 0.050 inch. Further, the face portion 1962 may have a thickness of less than or equal to 0.030 inch. The apparatus, methods, and articles of manufacture described herein are not limited in this regard.

Figure 22:
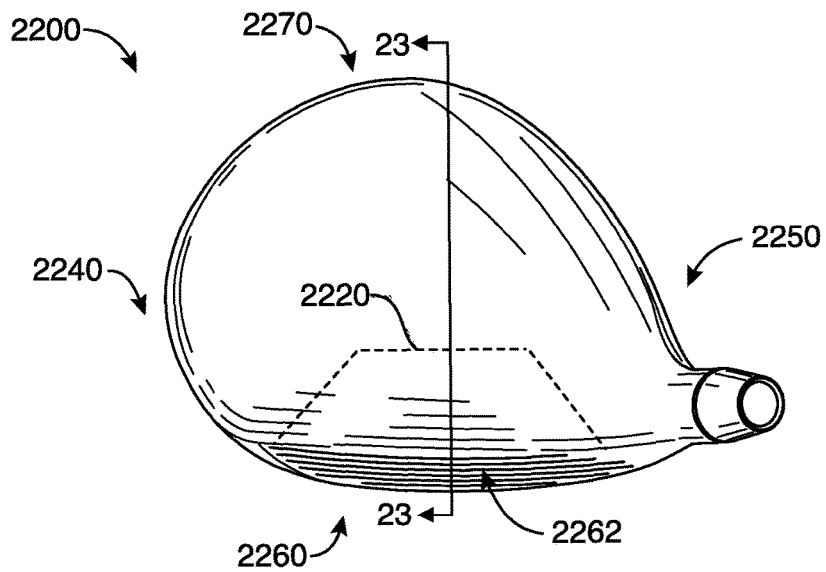
FIG. 22 depicts a top view of a golf club head according to yet another embodiment of the apparatus, methods, and articles of manufacture described herein.
Figure 23:
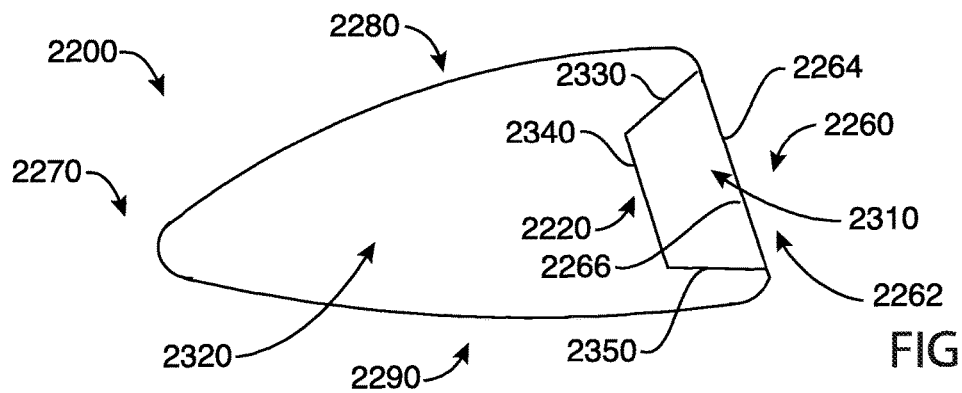
FIG. 23 depicts a cross-sectional view of the example golf club head of FIG. 22 along line 23-23.
Figure 24:
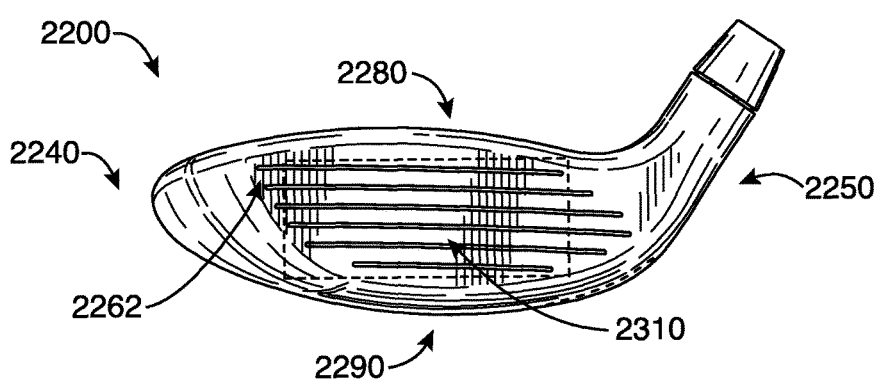
FIG. 24 depicts a front view of the example golf club head of FIG. 22.

The cavity wall portion 1920 may include multiple sections. Turning to FIGS. 22-24, for example, a golf club head 2200 may include a body portion 2210 and a cavity wall portion 2220. The body portion 2210 may include a toe portion 2240, a heel portion 2250, a front portion 2260, a rear portion 2270, a top portion 2280 (e.g., a crown portion), and a bottom portion 2290 (e.g., a sole portion). The front portion 2260 may include a face portion 2262 (e.g., a strike face) with a front surface 2264 and a back surface 2266. The cavity wall portion 2220 may extend from the back surface 2266 to form a first interior cavity 2310 and a second interior cavity 2320 within the body portion 2210. The cavity wall portion 2220 may include two or more wall sections, generally shown as 2330, 2340, and 2350 in FIG. 23. The cavity wall portion 2220 may form a truncated pyramid-like structure with a rectangular base (e.g., FIG. 24) or a square base on the back surface 2266. Alternatively, the cavity wall portion 2220 may form a cuboid-like structure (i.e., with a rectangular base) or a cuboid-like structure (i.e., with a square base) on the back surface 2266. In another example, the cavity wall portion 2220 may form a square-based, pyramid-like structure on the back surface 2266. In yet another example, the cavity wall portion 2220 may form a triangular-based, pyramid-like structure or a triangular prism-like structure on the back surface 2266. Similar to the first interior cavity 2010 (FIGS. 19-21), the first interior cavity 2310 may be partially or entirely filled with an elastic polymer or elastomer material (e.g., a TPE material, a TPU material, etc.). The elastic polymer material may be injected into the first interior cavity 2310 via an injection molding process via a port on the face portion 2262. The apparatus, methods, and articles of manufacture described herein are not limited in this regard.

Figure 25:
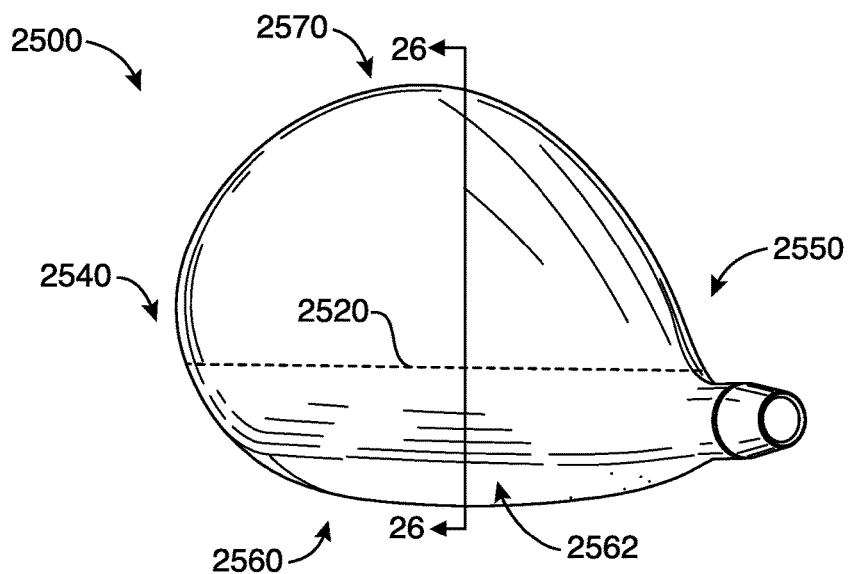
FIG. 25 depicts a top view of a golf club head according to yet another embodiment of the apparatus, methods, and articles of manufacture described herein.
Figure 26:
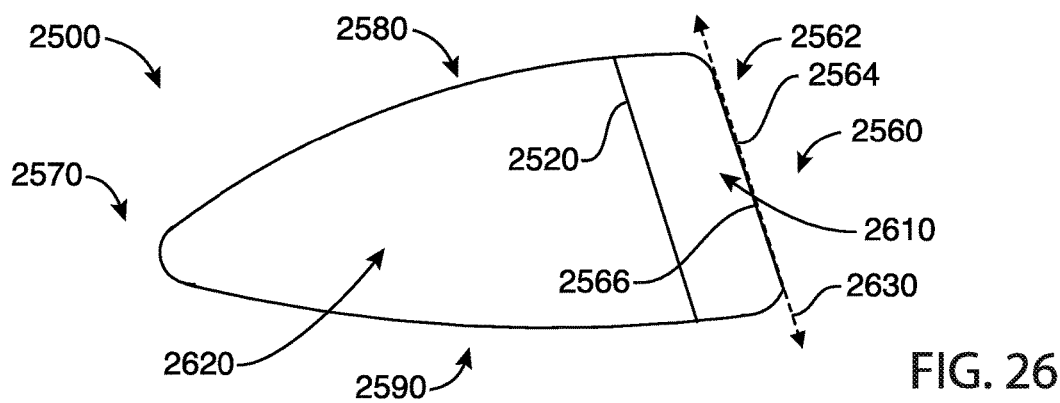
FIG. 26 depicts a cross-sectional view of the example golf club head of FIG. 25 along line 26-26.

As illustrated in FIGS. 25 and 26, for example, a golf club head 2500 may include a body portion 2510 and a cavity wall portion 2520. The body portion 2510 may include a toe portion 2540, a heel portion 2550, a front portion 2560, a rear portion 2570, a top portion 2580 (e.g., a crown portion), and a bottom portion 2590 (e.g., a sole portion). The front portion 2560 may include a face portion 2562 (e.g., a strike face) with a front surface 2564 and a back surface 2566. The face portion 2562 may be associated with a loft plane 2605 that defines the loft angle of the golf club head 2500.

Figure 27:
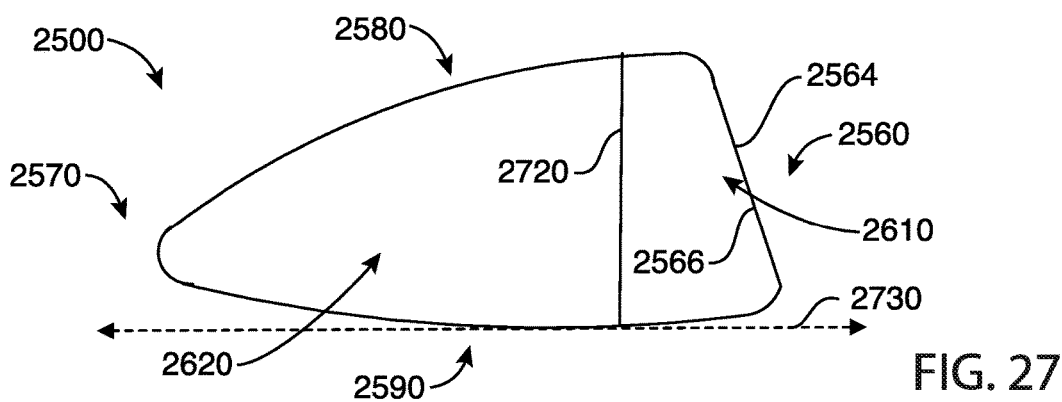
FIG. 27 depicts a cross-sectional view of the example golf club head of FIG. 25 along line 26-26 according to another embodiment of the apparatus, methods, and articles of manufacture described herein.

The cavity wall portion 2520 may be a single flat wall section. In particular, the cavity wall portion 2520 may extend between the toe portion 2540 and the heel portion 2550 and between the top portion 2580 and the bottom portion 2590 to form a first interior cavity 2610 and a second interior cavity 2620 within the body portion 2510. The cavity wall portion 2520 may be parallel or substantially parallel to the loft plane 2605. Alternatively as shown in FIG. 27, a cavity wall portion 2720 may be perpendicular or substantially perpendicular to a ground plane 2730. Similar to the first interior cavities 2010 (FIGS. 19-21) and 2310 (FIGS. 22-24), the first interior cavity 2610 may be partially or entirely filled with an elastic polymer or elastomer material. The elastic polymer material may be injected into the first interior cavity 2610 via an injection molding process via a port on the face portion 2562 and/or the bottom portion 2590. The apparatus, methods, and articles of manufacture described herein are not limited in this regard.

Alternatively, the cavity wall portion 2520 may extend between the bottom portion 2590 and a top-and-front transition region (i.e., a transition region between the top portion 2580 and the front portion 2570) so that the cavity wall portion 2520 and the loft plane 2630 may not be parallel to each other. In another example, the cavity wall portion 2520 may extend between the top portion 2580 and a bottom-and-front transition region (i.e., a transition region between the bottom portion 2590 and the front portion 2570) so that the cavity wall portion 2520 and the loft plane 2630 may be not parallel to each other. Although FIGS. 25-27, may depict the cavity wall portions 2520 and 2720 being flat or substantially flat, the cavity wall portions 2520 and/or 2720 may be concaved or convexed relatively to the face portion 2562. The apparatus, methods, and articles of manufacture described herein are not limited in this regard.

While above examples may describe a cavity wall portion dividing an interior cavity of a hollow body portion to form two separate interior cavities with one interior cavity partially or entirely filled with an elastic polymer material, the apparatus, methods, and articles of manufacture described herein may include two or more cavity wall portions dividing an interior cavity of a hollow body portion to form three or more separate interior cavities with at least two interior cavities partially or entirely filled with an elastic polymer material. In one example, one interior cavity may be partially or entirely filled with a TPE material whereas another interior cavity may be partially or entirely filled with a TPU material. The apparatus, methods, and articles of manufacture described herein are not limited in this regard.

Referring back to FIGS. 1-14, the face portion 162 may include a non-smooth back surface to improve adhesion and/or mitigate delamination between the face portion 162 and the elastic polymer material used to fill the interior cavity 700 (e.g., FIG. 7). Various methods and/or processes such as an abrasive blasting process (e.g., a bead blasting process, a sand blasting process, other suitable blasting process, or any combination thereof) and/or a milling (machining) process may be used to form the back surface 166 into a non-smooth surface. For example, the back surface 166 may have with a surface roughness (Ra) ranging from 0.5 to 250 pin (0.012 to 6.3 µm). The apparatus, methods, and articles of manufacture are not limited in this regard.

Figure 28:
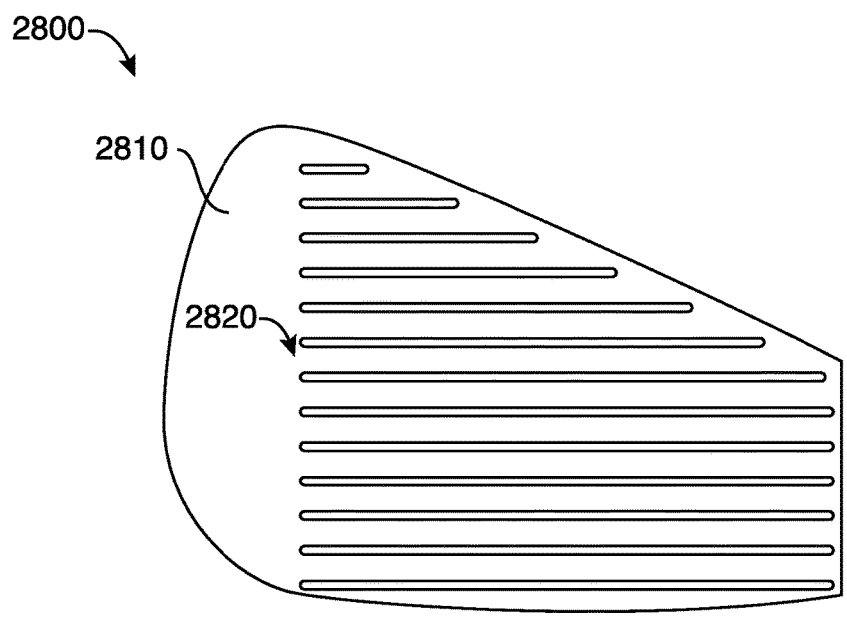
FIG. 28 depicts a front view of a face portion of the example golf club head of FIG. 1.
Figure 29:
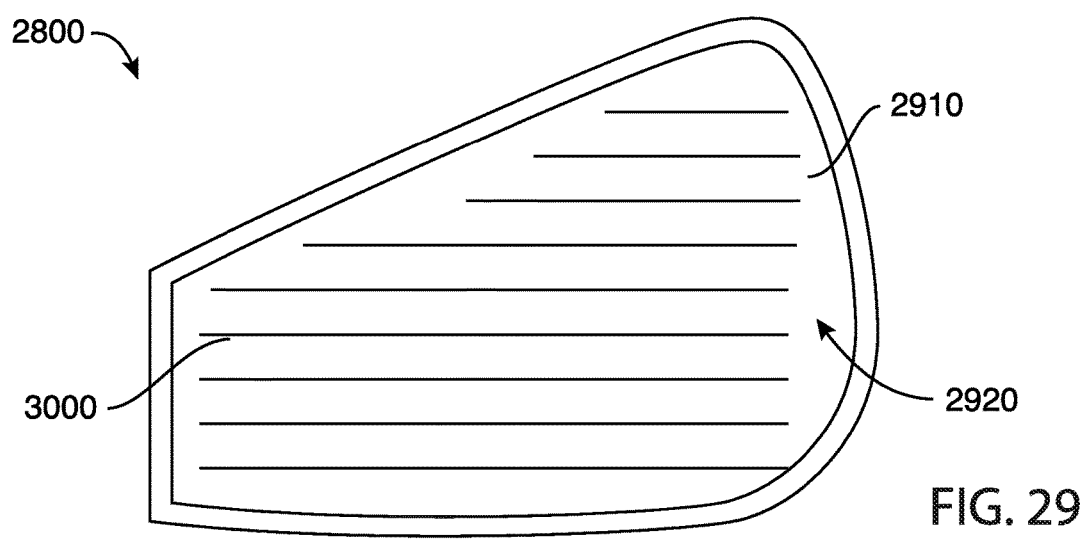
FIG. 29 depicts a back view of the face portion of FIG. 28.
Figure 30:
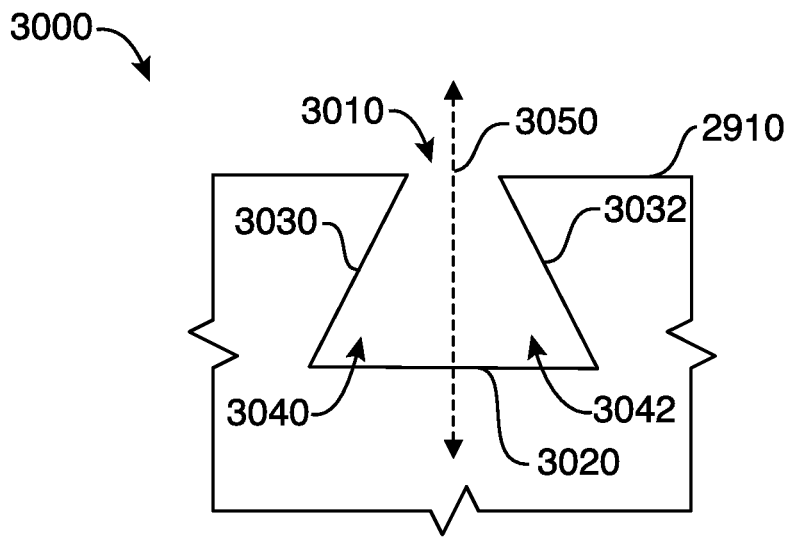
FIG. 30 depicts a cross-sectional view of an example channel of the face portion of FIG. 28.

As illustrated in FIGS. 28-30, for example, a face portion 2800 may include the front surface 2810, and the back surface 2910. The front surface 2810 may include one or more grooves, generally shown as 2820, extending longitudinally across the front surface 2810 (e.g., extending between the toe portion 140 and the heel portion 150 of FIG. 1). The front surface 2810 may be used to impact a golf ball (not shown).

The back surface 2910 may also include one or more channels, generally shown as 2920. The channels 2920 may extend longitudinally across the back surface 2910. The channels 2920 may be parallel or substantially parallel to each other. The channels 2920 may engage with the elastic polymer material used to fill the interior cavity 700, and serve as a mechanical locking mechanism between the face portion 2800 and the elastic polymer material. In particular, a channel 3000 may include an opening 3010, a bottom section 3020, and two sidewalls, generally shown as 3030 and 3032. The bottom section 3020 may be parallel or substantially parallel to the back surface 2910. The two sidewalls 3030 and 3032 may be converging sidewalls (i.e., the two sidewalls 3030 and 3032 may not be parallel to each other). The bottom section 3020 and the sidewalls 3030 and 3032 may form two undercut portions, generally shown as 3040 and 3042. That is, a width 3015 at the opening 3010 may be less than a width 3025 of the bottom section 3020. A cross section of the channel 3000 may be symmetrical about an axis 3050. While FIG. 30 may depict flat or substantially flat sidewalls, the two sidewalls 3030 and 3032 may be curved (e.g., convex relative to each other).

Figure 31:
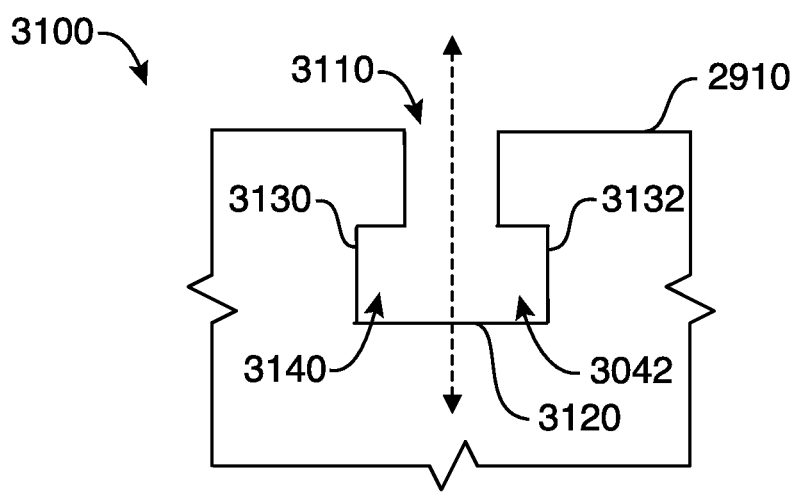
FIG. 31 depicts a cross-sectional view of another example channel of the face portion of FIG. 28.

Instead of flat or substantially flat sidewalls as shown in FIG. 30, a channel may include other types of sidewalls. As illustrated in FIG. 31, for example, a channel 3100 may include an opening 3110, a bottom section 3120, and two sidewalls, generally shown as 3130 and 3132. The bottom section 3120 may be parallel or substantially parallel to the back surface 2910. The two sidewalls 3130 and 3132 may be stepped sidewalls. The bottom section 3120 and the sidewalls 3130 and 3132 may form two undercut portions, generally shown as 3140 and 3142. That is, a width 3115 at the opening 3110 may be less than a width 3125 of the bottom section 3120. A cross section of the channel 3100 may be symmetrical about an axis 3150.

Figure 32:
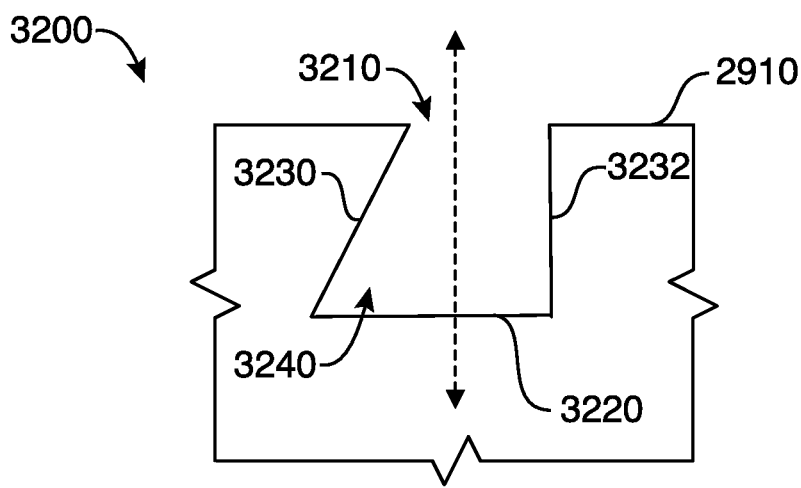
FIG. 32 depicts a cross-sectional view of yet another example channel of the face portion of FIG. 28.

Instead of being symmetrical as shown in FIGS. 30 and 31, a channel may be asymmetrical. As illustrated in FIG. 32, for another example, a channel 3200 may include an opening 3210, a bottom section 3220, and two sidewalls, generally shown as 3230 and 3232. The bottom section 3220 may be parallel or substantially parallel to the back surface 2910. The bottom section 3220 and the sidewall 3230 may form an undercut portion 3240.

Figure 33:
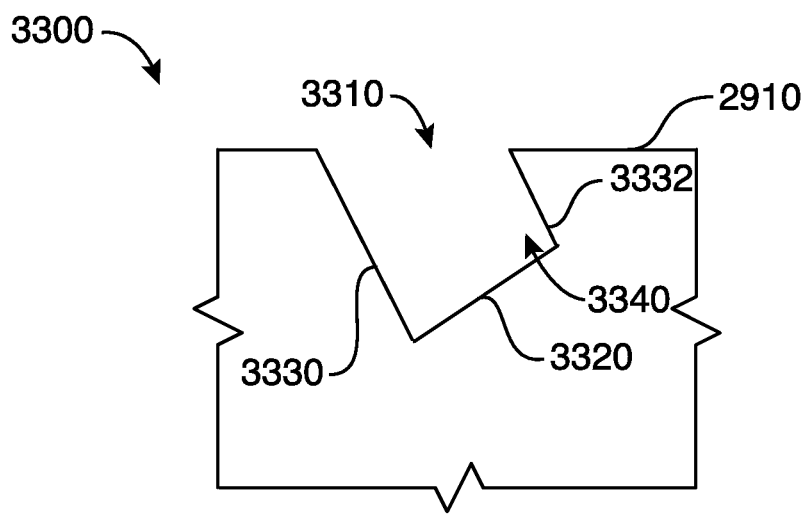
FIG. 33 depicts a cross-sectional view of yet another example channel of the face portion of FIG. 28.

Referring to FIG. 33, for example, a channel 3300 may include an opening 3310, a bottom section 3320, and two sidewalls, generally shown as 3330 and 3332. The bottom section 3320 may not be parallel or substantially parallel to the back surface 2910. The two sidewalls 3330 and 3332 may be parallel or substantially parallel to each other but one sidewall may be longer than the other sidewall. The bottom section 3320 and the sidewall 3332 may form an undercut portion 3340.

Figure 34:
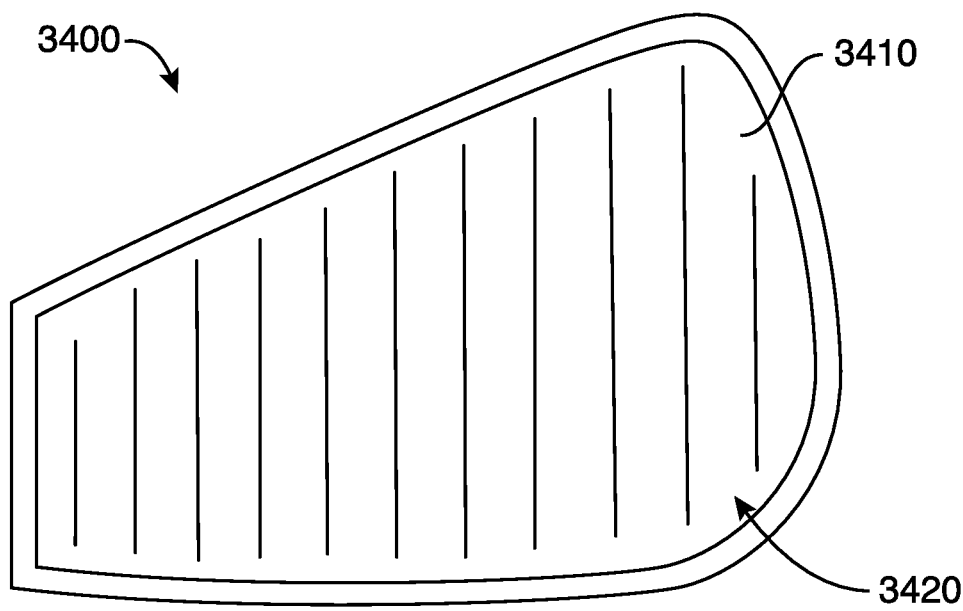
FIG. 34 depicts a back view of another example face portion of the example golf club head of FIG. 1.
Figure 35:
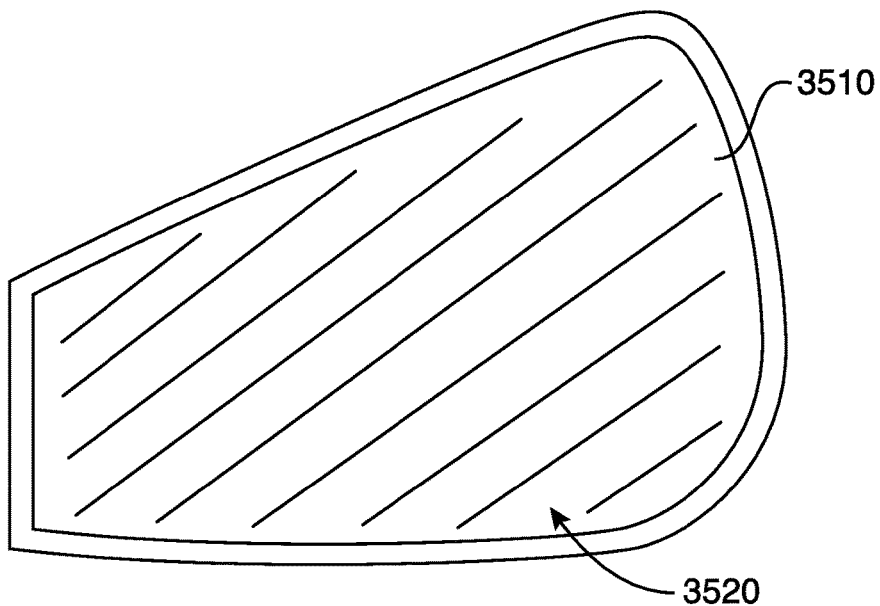
FIG. 35 depicts a back view of yet another example face portion of the example golf club head of FIG. 1.
Figure 36:
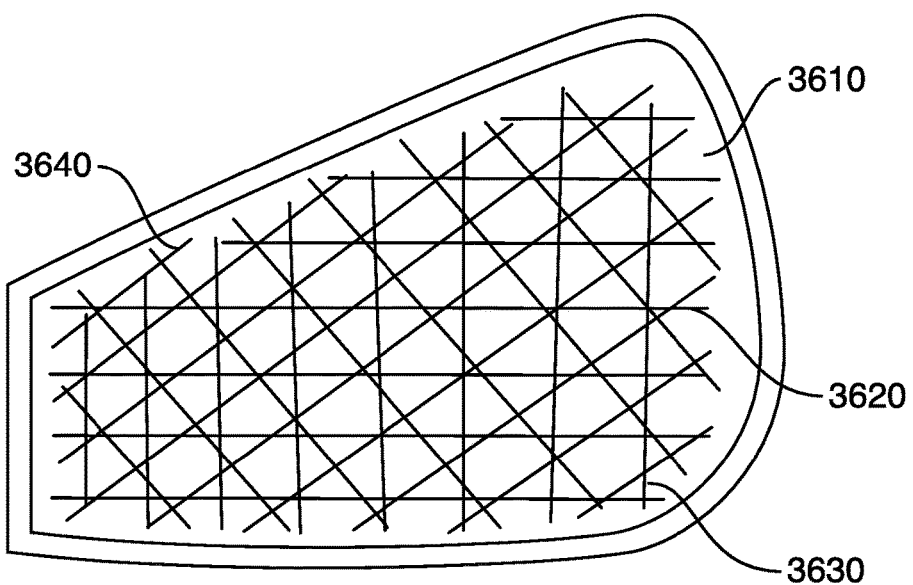
FIG. 36 depicts a back view of yet another example face portion of the example golf club head of FIG. 1.

In the example as shown in FIG. 34, a face portion 3400 may include a back surface 3410 with one or more channels, generally shown as 3420, extending laterally across the back surface 3410 (e.g., extending between the top portion 180 and the sole portion 190 of FIG. 1). In another example as depicted in FIG. 35, a face portion 3500 may include a back surface 3510 with one or more channels, generally shown as 3520, extending diagonally across the back surface 3510. Alternatively, a face portion may include a combination of channels extending in different directions across a back surface of the face portion (e.g., extending longitudinally, laterally, and/or diagonally). Turning to FIG. 36, for yet another example, a face portion 3600 may include a back surface 3610 with one or more channels, generally shown as 3620, 3630, and 3640, extending in different directions across the back surface 3610. In particular, the face portion 3600 may include a plurality of channels 3620 extending longitudinally across the back surface 3610, a plurality of channels 3630 extending laterally across the back surface 3610, and a plurality of channels 3640 extending diagonally across the back surface 3610.

Figure 37:
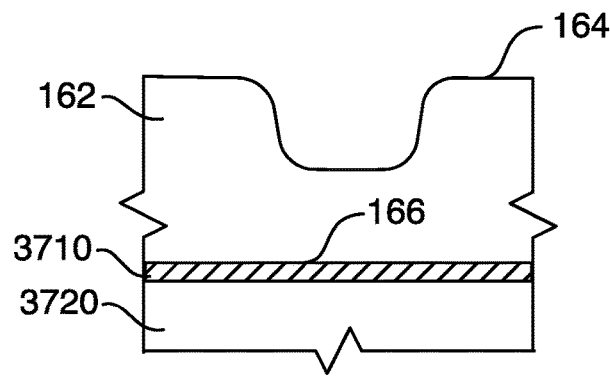
FIG. 37 depicts a cross-sectional view of the example golf club head of FIG. 1.

In addition or alternatively, the golf club head 100 may include a bonding agent to improve adhesion and/or mitigate delamination between the face portion 162 and the elastic polymer material used to fill the interior cavity 700 of the golf club head 100 (e.g., FIG. 7). Referring to FIG. 37, for example, the golf club head 100 may include the face portion 162, a bonding portion 3710, and an elastic polymer material 3720. In one example, the bonding portion 3710 may be low-viscosity, organic, solvent-based solutions and/or dispersions of polymers and other reactive chemicals such as MEGUM™, ROBOND™, and/or THIXON™ materials manufactured by the Dow Chemical Company, Auburn Hills, Mich. In another example, the bonding portion 3710 may be LOCTITE® materials manufactured by Henkel Corporation, Rocky Hill, Conn. The bonding portion 3710 may be applied to the back surface 166 to bond the elastic polymer material 3720 to the face portion 162 (e.g., extending between the back surface 166 and the elastic polymer material 3720). For example, the bonding portion 3710 may be applied when the interior cavity 700 is filled with the elastic polymer material 3720 via an injection-molding process. The apparatus, methods, and articles of manufacture are not limited in this regard.

Figure 38:
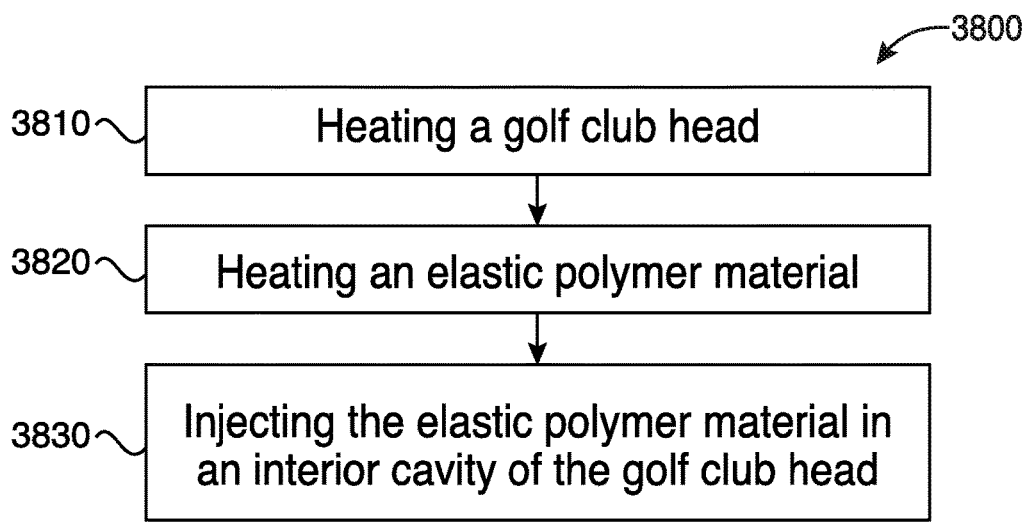
FIG. 38 depicts another manner in which an example golf club head described herein may be manufactured.

FIG. 38 depicts one manner in which the interior cavity 700 of the golf club head 100 or any of the golf club heads described herein is partially or entirely filled with an elastic polymer material or an elastomer material. The process 3800 may begin with heating the golf club head 100 to a certain temperature (block 3810). In one example, the golf club head 100 may be heated to a temperature ranging between 150° C. to 250° C., which may depend on factors such as the vaporization temperature of the elastic polymer material to be injected in the interior cavity 700. The elastic polymer material may then be heated to a certain temperature (block 3820). The elastic polymer material may be a non-foaming and injection-moldable thermoplastic elastomer (TPE) material. Accordingly, the elastic polymer material may be heated to reach a liquid or a flowing state prior to being injected into the interior cavity 700. The temperature to which the elastic polymer material may be heated may depend on the type of elastic polymer material used to partially or fully fill the interior cavity 700. The heated elastic polymer material may be injected into the interior cavity 700 to partially or fully fill the interior cavity 700 (block 3830). The elastic polymer material may be injected into the interior cavity 700 from one or more of the weight ports described herein (e.g., one or more weight ports of the first and second sets of weight ports 1420 and 1430, respectively, shown in FIG. 14). One or more other weight ports may allow the air inside the interior cavity 700 displaced by the elastic polymer material to vent from the interior cavity 700. In one example, the golf club head 100 may be oriented horizontally as shown in FIG. 14 during the injection molding process. The elastic polymer material may be injected into the interior cavity 700 from weight ports 1431 and 1432. The weight ports 1421, 1422 and/or 1423 may serve as air ports for venting the displaced air from the interior cavity 700. Thus, regardless of the orientation of the golf club head 100 during the injection molding process, the elastic polymer material may be injected into the interior cavity 700 from one or more lower positioned weight ports while one or more upper positioned weight ports may serve as air vents. The mold (i.e., the golf club head 100) may then be cooled passively (e.g., at room temperature) or actively so that the elastic polymer material reaches a solid state and adheres to the back surface 166 of the face portion 162. The elastic polymer material may directly adhere to the back surface 166 of the face portion 162. Alternatively, the elastic polymer material may adhere to the back surface 166 of the face portion 162 with the aid of the one or more structures on the back surface 166 and/or a bonding agent described herein (e.g., the bonding portion 3710 shown in FIG. 37). The apparatus, methods, and articles of manufacture described herein are not limited in this regard.

As discussed above, the elastic polymer material may be heated to a liquid state (i.e., non-foaming) and solidifies after being injection molded in the interior cavity 700. An elastic polymer material with a low modulus of elasticity may provide vibration and noise dampening for the face portion 162 when the face portion 162 impacts a golf ball. For example, an elastic polymer material that foams when heated may provide vibration and noise dampening. However, such a foaming elastic polymer material may not have sufficient rigidity to provide structural support to a relatively thin face portion because of possible excessive deflection and/or compression of the elastic polymer material when absorbing the impact of a golf ball. In one example, the elastic polymer material that is injection molded in the interior cavity 700 may have a relatively high modulus of elasticity to provide structural support to the face portion 162 and yet elastically deflect to absorb the impact forces experienced by the face portion 162 when striking a golf ball. Thus, a non-foaming and injection moldable elastic polymer material with a relatively high modulus of elasticity may be used for partially or fully filling the interior cavity 700 to provide structural support and reinforcement for the face portion 162 in addition to providing vibration and noise dampening. That is, the non-foaming and injection moldable elastic polymer material may be a structural support portion for the face portion 162. The apparatus, methods, and articles of manufacture are not limited in this regard.

Figure 39:
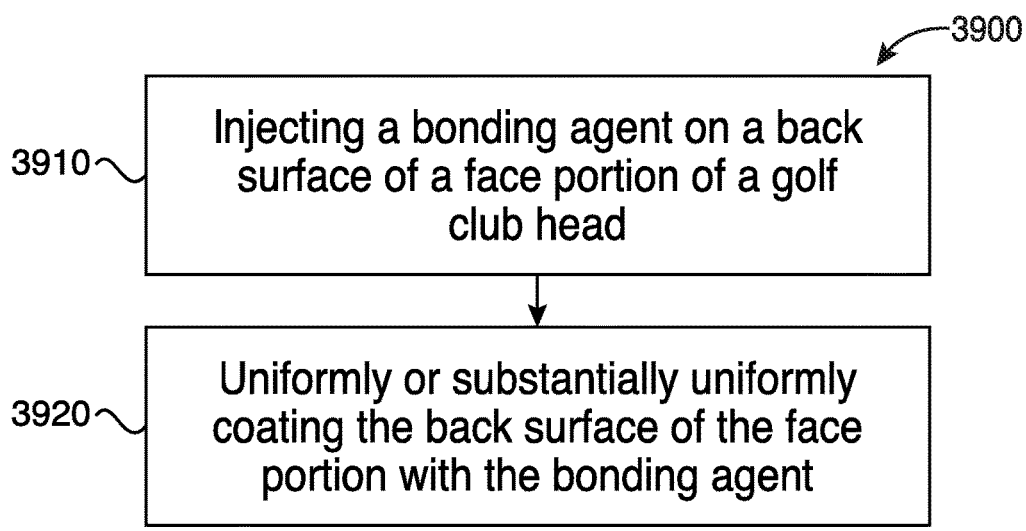
FIG. 39 depicts yet another manner in which an example golf club head described herein may be manufactured.

FIG. 39 depicts one manner in which a bonding agent as described herein may be applied to a golf club head prior to partially of fully injecting an elastic polymer in the interior cavity 700. In the example of FIG. 39, the process 3900 may begin with injecting a bonding agent on the back surface 166 of the face portion 162 (block 3910). The bonding agent may be injected on the back surface 166 prior to or after heating the golf club head as described above depending on the properties of the bonding agent. The bonding agent may be injected through one or more of the first set of weight ports 1420 and/or the second set of weight ports 1430. The bonding agent may be injected on the back surface 166 through several or all of the first set of weight ports 1420 and the second set of weight ports 1430. For example, an injection instrument such as a nozzle or a needle may be inserted into each weight port until the tip or outlet of the instrument is near the back surface 166. The bonding agent may then be injected on the back surface 166 from the outlet of the instrument. Additionally, the instrument may be moved, rotated and/or swiveled while inside the interior cavity 700 so that the bonding agent is injected onto an area of the back surface 166 surrounding the instrument. For example, the outlet of the injection instrument may be moved in a circular pattern while inside a weight port to inject the bonding agent in a corresponding circular pattern on the back surface 166. Each of the first set of weight ports 1420 and the second set of weight ports 1430 may be utilized to inject a bonding agent on the back surface 166. However, utilizing all of first weight ports 1420 and/or the second set of weight ports 1430 may not be necessary. For example, using every other adjacent weight port may be sufficient to inject a bonding agent on the entire back surface 166. In another example, weight ports 1421, 1422 1431, 1433 and 1436 may be used to inject the bonding agent on the back surface 166. The apparatus, methods, and articles of manufacture are not limited in this regard.

The process 3900 may also include spreading the bonding agent on the back surface 166 (block 3920) after injection of the bonding agent onto the back surface 166 so that a generally uniform coating of the bonding agent is provided on the back surface 166. According to one example, the bonding agent may be spread on the back surface 166 by injecting air into the interior cavity 700 through one or more of the first set of weight ports 1420 and the second set of weight ports 1430. The air may be injected into the interior cavity 700 and on the back surface 166 by inserting an air nozzle into one or more of the first set of weight ports 1420 and the second set of weight ports 1430. According to one example, the air nozzle may be moved, rotated and/or swiveled at a certain distance from the back surface 166 so as to uniformly blow air onto the bonding agent to spread the bonding agent on the back surface 166 for a uniform coating or a substantially uniform coating of the bonding agent on the back surface 166. The apparatus, methods, and articles of manufacture are not limited in this regard.

The process 3900 may include a single step of injecting and uniformly or substantially uniformly coating the back surface 166 with the bonding agent. In one example, the bonding agent may be injected on the back surface 166 by being converted into fine particles or droplets (i.e., atomized) and sprayed on the back surface 166. Accordingly, the back surface 166 may be uniformly or substantially uniformly coated with the bonding agent in one step. A substantially uniform coating of the back surface 166 with the bonding agent may be defined as a coating having slight non-uniformities due to the injection process or the manufacturing process. However, such slight non-uniformities may not affect the bonding of the filler material to the back surface 166 with the bonding agent as described herein. For example, spraying the bonding agent on the back surface 166 may result in overlapping regions of the bonding agent having a slightly greater coating thickness than other regions of the bonding agent on the back surface 166. The apparatus, methods, and articles of manufacture are not limited in this regard.

Figure 40:
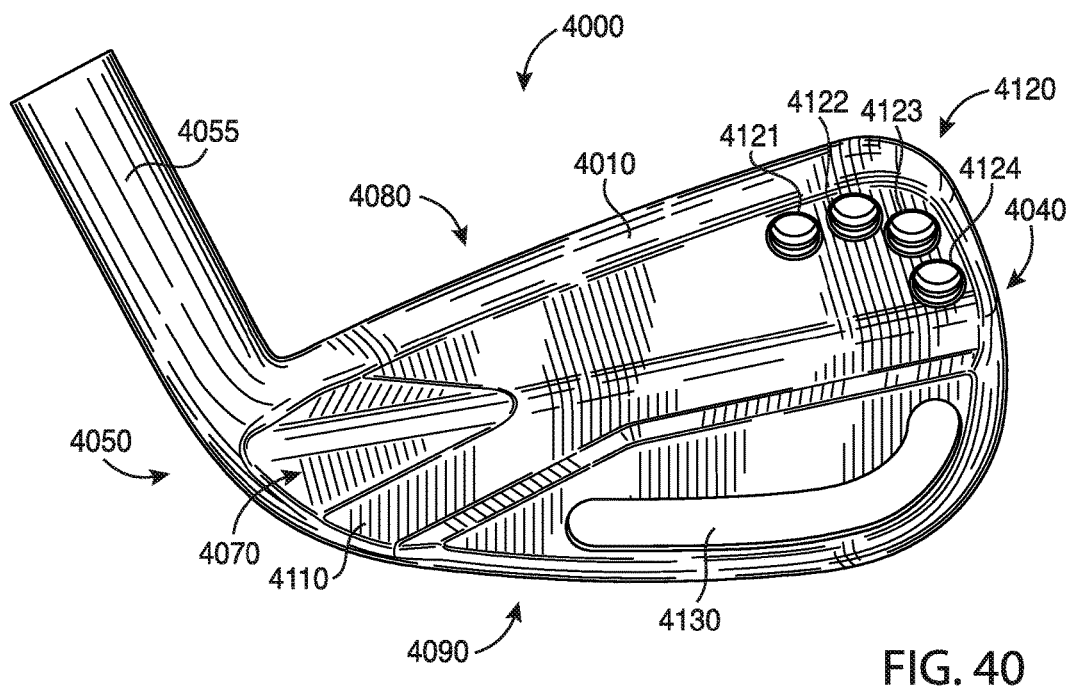
FIG. 40 depicts a rear view of a golf club head according to an embodiment of the apparatus, methods, and articles of manufacture described herein.
Figure 41:
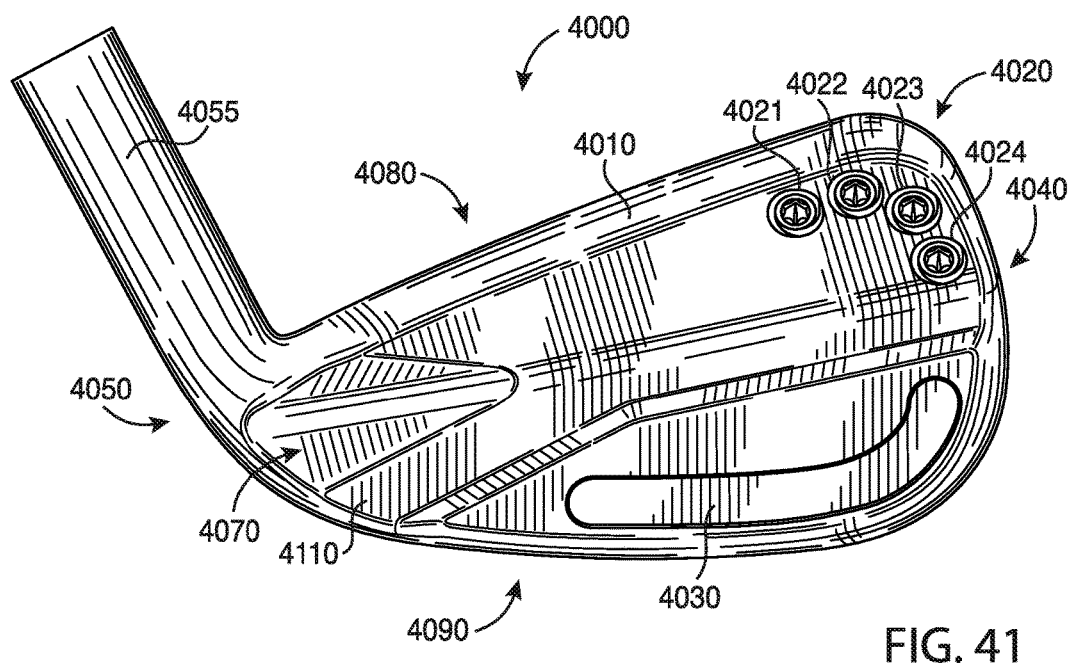
FIG. 41 depicts a rear view of the golf club head of FIG. 40.

As described herein, any two or more of the weight portions may be configured as a single weight portion. In the example of FIGS. 40 and 41, a golf club head 4000 may include a body portion 4010 and two or more weight portions, generally shown as a first set of weight portions 4020 (e.g., shown as weight portions 4021, 4022, 4023, and 4024) and a second weight portion 4030. The body portion 4010 may include a toe portion 4040, a heel portion 4050, a front portion (not shown), a back portion 4070, a top portion 4080, and a sole portion 4090. The front portion may be similar in many respects to the front portion 160 of the golf club head 100. Accordingly, details of the front portion of the golf club head 4000 are not provided.

The body portion 4010 may be made of a first material whereas the first set of weight portions 4020 and the second weight portion 4030 may be made of a second material. The first and second materials may be similar or different materials. For example, the body portion 4010 may be partially or entirely made of a steel-based material (e.g., 17-4 PH stainless steel, Nitronic® 50 stainless steel, maraging steel or other types of stainless steel), a titanium-based material, an aluminum-based material (e.g., a high-strength aluminum alloy or a composite aluminum alloy coated with a high-strength alloy), any combination thereof, and/or other suitable types of materials. The first set of weight portions 4020 and the second weight portion 4030 may be partially or entirely made of a high-density material such as a tungsten-based material or other suitable types of materials. Alternatively, the body portion 4010 and/or the first set of weight portions 4020 and the second weight portion 4030 may be partially or entirely made of a non-metal material (e.g., composite, plastic, etc.). The apparatus, methods, and articles of manufacture are not limited in this regard.

The golf club head 4000 may be an iron-type golf club head (e.g., a 1-iron, a 2-iron, a 3-iron, a 4-iron, a 5-iron, a 6-iron, a 7-iron, an 8-iron, a 9-iron, etc.) or a wedge-type golf club head (e.g., a pitching wedge, a lob wedge, a sand wedge, an n-degree wedge such as 44 degrees (°), 48°, 52°, 56°, 60°, etc.). Although FIGS. 40 and 41 may depict a particular type of club head, the apparatus, methods, and articles of manufacture described herein may be applicable to other types of club heads (e.g., a driver-type club head, a fairway wood-type club head, a hybrid-type club head, a putter-type club head, etc.). The apparatus, methods, and articles of manufacture described herein are not limited in this regard.

The toe portion 4040 and the heel portion 4050 may be on opposite ends of the body portion 4010. The heel portion 4050 may include a hosel portion 4055 configured to receive a shaft (not shown) with a grip (not shown) on one end and the golf club head 4000 on the opposite end of the shaft to form a golf club.

The back portion 4070 may include a back wall portion 4110 with one or more exterior weight ports along a periphery of the back portion 4070, generally shown as a first set of exterior weight ports 4120 (e.g., shown as weight ports 4121, 4122, 4123, and 4124) and a second weight port 4130. Each exterior weight port of the first set of weight ports 4120 may be associated with a port diameter. In one example, the port diameter may be about 0.25 inch (6.35 millimeters). Any two adjacent exterior weight ports of the first set of exterior weight ports 4120 may be separated by less than the port diameter. The first set of weight ports 4120 and the second weight port 4130 may be exterior weight ports configured to receive one or more weight portions. Each weight portion of the first set of weight portions 4020 (e.g., shown as weight portions 4021, 4022, 4023, and 4024) may be disposed in a weight port of the first set of weight ports 4120 (e.g., shown as weight ports 4121, 4122, 4123, and 4124) located at or proximate to the toe portion 4040 and/or the top portion 4080 on the back portion 4070. For example, the weight portion 4021 may be partially or entirely disposed in the weight port 4121. In another example, the weight portion 4022 may be disposed in a weight port 4122 located in a transition region between the top portion 4080 and the toe portion 4040 (e.g., a top-and-toe transition region).

The second weight port 4130 may be a recess extending from the toe portion 4040 or a location proximate to the toe portion 4040 to the sole portion or a location proximate to the sole portion 4090 and through the transition region between the toe portion 4040 and the sole portion 4090. Accordingly, as shown in FIG. 40, the second weight port 4130 may resemble an L-shaped recess. The second weight portion 4030 may resemble the shape of the second weight port 4130 and may be configured to be disposed in the second weight port 4130. The second weight portion 4030 may be partially or fully disposed in the weight port 4130. The second weight portion 4030 may have any shape such as oval, rectangular, triangular, or any geometric or non-geometric shape. The second weight port 4130 may be shaped similar to the second weight portion 4030. However, portions of the second weight portion 4030 that are inserted in the second weight port 4130 may have similar shapes as the weight port 4130. As described in detail herein, any of the weight portions described herein, including the weight portions 4020 and the second weight portion 4030 may be coupled to the back portion 4070 of the body portion 4010 with various manufacturing methods and/or processes (e.g., a bonding process, a welding process, a brazing process, a mechanical locking method, any combination thereof, or other suitable manufacturing methods and/or processes).

The weight portions of the first set of weight portions 4020 may have similar or different physical properties (e.g., color, shape, size, density, mass, volume, etc.). In the illustrated example as shown in FIG. 41, each of the weight portions of the first set of weight portions 4020 may have a cylindrical shape (e.g., a circular cross section). Alternatively, each of the weight portions of the first set of weight portions 4020 may have different shapes. Although the above examples may describe weight portions having a particular shape, the apparatus, methods, and articles of manufacture described herein may include weight portions of other suitable shapes (e.g., a portion of or a whole sphere, cube, cone, cylinder, pyramid, cuboidal, prism, frustum, or other suitable geometric shape). The apparatus, methods, and articles of manufacture described herein are not limited in this regard.

The apparatus, methods, and articles of manufacture described herein may be implemented in a variety of embodiments, and the foregoing description of some of these embodiments does not necessarily represent a complete description of all possible embodiments. Instead, the description of the drawings, and the drawings themselves, disclose at least one embodiment, and may disclose alternative embodiments. Further, the terms "and" and "or" may have both conjunctive and disjunctive meanings.

As the rules of golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

Although certain example apparatus, methods, and articles of manufacture have been described herein, the scope of coverage of this disclosure is not limited thereto. On the contrary, this disclosure covers all apparatus, methods, and articles of articles of manufacture fairly falling within the scope of the appended claims either literally or under the doctrine of equivalents.

What is claimed is:

1. A golf club head comprising:
a body portion having a toe portion, a heel portion, a top portion, a sole portion, a back portion with a plurality of weight portions, and a front portion having a face portion with a thickness extending between a front surface and a back surface, the thickness being less than or equal to 1.5 millimeters (0.06 inch);
an interior cavity extending between the top and sole portions and between the face and back portions;
an elastic polymer material injection molded in the interior cavity to structurally support the face portion during impact with a golf ball;
a bonding portion coupled between the back surface of the face portion and the elastic polymer material;
wherein a greater number of weight portions of the plurality of weight portions are located on the back portion below a horizontal midplane of the body portion than above the horizontal midplane, and
wherein at least one weight portion of the plurality of weight portions is constructed from a different material than the body portion.

2. A golf club head as defined in claim 1, wherein the elastic polymer material comprises at least one of a thermoplastic elastomer material or a thermoplastic polyurethane material.

3. A golf club head as defined in claim 1, wherein the bonding portion comprises a uniform coating or a substantially uniform coating of a bonding material on the back surface of the face portion.

4. A golf club head as defined in claim 1, wherein the bonding portion comprises a portion partially or entirely made of an adhesive material.

5. A golf club head as defined in claim 1, wherein the face portion comprises a substantially uniform thickness from at or proximate to the top portion to at or proximate to the sole portion.

6. A golf club head comprising:
 a body portion having a toe portion, a heel portion, a top portion, a sole portion, a back portion with a plurality of weight portions, and a front portion having a face portion with a front surface and a back surface;
 an interior cavity extending between the top and sole portions and between the face and back portions;
 an elastic polymer material injection molded in the interior cavity, the elastic polymer configured to structurally support the face portion during impact with a golf ball;
 a bonding portion in the interior cavity configured to couple the elastic polymer material to the back surface,
 wherein a greater number of weight portions of the plurality of weight portions are located on the back portion below a horizontal midplane of the body portion than above the horizontal midplane, and
 wherein a greater number of weight portions of the plurality of weight portions are closer to the toe portion than the heel portion.

7. A golf club head as defined in claim 6, wherein the elastic polymer material comprises at least one of a thermoplastic elastomer material or a thermoplastic polyurethane material.

8. A golf club head as defined in claim 6, wherein the face portion comprises a thickness extending between the front and back surfaces of less than or equal to 1.5 millimeters (0.06 inch).

9. A golf club head as defined in claim 6, wherein the face portion comprises a substantially uniform thickness from at or proximate to the top portion to at or proximate to the sole portion, and wherein the thickness extends less than or equal to 1.5 millimeters (0.06 inch) between the front and back surfaces.

10. A golf club head as defined in claim 6, wherein the bonding portion comprises a bonding material comprising an adhesive material.

11. A golf club head as defined in claim 6, wherein the bonding portion comprises a uniform coating or a substantially uniform coating of a bonding material on the back surface of the face portion.

12. A golf club head comprising:
 a body portion having a toe portion, a heel portion, a top portion, a sole portion, a back portion with a plurality of weight portions, and a front portion having a face portion with a front surface, a back surface, a plurality of grooves on the front surface, and a thickness extending between the front and back surfaces of less than or equal to 1.5 millimeters (0.06 inch);
 an interior cavity extending between the top and sole portions and between the face and back portions;
 a structural support portion comprising an elastic polymer material injection molded in the interior cavity, the structural support portion extending between the front and back portions within the interior cavity and attached to the back surface of the face portion, the structural support portion configured to structurally support the face portion during impact with a golf ball;
 wherein a greater number of weight portions of the plurality of weight portions are located on the back portion below a horizontal midplane of the body portion than above the horizontal midplane, and
 wherein a greater number of weight portions of the plurality of weight portions are closer to the toe portion than the heel portion, and
 wherein at least one weight portion of the plurality of weight portions is constructed from a different material than the body portion.

13. A golf club head as defined in claim 12, wherein the elastic polymer material is injection molded in the interior cavity from at least one port on the body portion connected to the interior cavity.

14. A golf club head as defined in claim 12, wherein the structural support portion comprises at least one of a thermoplastic elastomer material or a thermoplastic polyurethane material injection molded in the interior cavity.

15. A golf club head as defined in claim 12, wherein the structural support portion comprises a non-foaming injection moldable elastic polymer material.

16. A golf club head as defined in claim 12, wherein the face portion comprises a substantially uniform thickness from at or proximate to the top portion to at or proximate to the sole portion.

17. A golf club head as defined in claim 12 further comprising a bonding portion configured to attach the structural support portion to the back surface of the face portion.

18. A golf club head as defined in claim 12 further comprising a bonding portion configured to attach the structural support portion to the back surface of the face portion, wherein the bonding portion comprises a bonding material comprising an adhesive material.

19. A golf club head as defined in claim 12 further comprising a bonding portion configured to attach the structural support portion to the back surface of the face portion, wherein the bonding portion comprises a uniform coating or a substantially uniform coating of a bonding material on the back surface of the face portion.

20. A golf club head as defined in claim 12, wherein the back surface of the face portion comprises one or more channels extending across the back surface and configured to engage a portion of the structural support portion.

* * * * *